US 6,665,476 B2

(12) United States Patent
Braun et al.

(10) Patent No.: US 6,665,476 B2
(45) Date of Patent: Dec. 16, 2003

(54) WAVELENGTH SELECTIVE OPTICAL ADD/DROP MULTIPLEXER AND METHOD OF MANUFACTURE

(75) Inventors: Alan Michael Braun, New Brunswick, NJ (US); Joseph Hy Abeles, East Brunswick, NJ (US); Robert Amantea, Manalapan, NJ (US)

(73) Assignee: Sarnoff Corporation, Princeton, NJ (US)

(*) Notice: Subject to any disclaimer, the term of this patent is extended or adjusted under 35 U.S.C. 154(b) by 26 days.

(21) Appl. No.: 09/920,795

(22) Filed: Aug. 2, 2001

(65) Prior Publication Data

US 2002/0039470 A1 Apr. 4, 2002

Related U.S. Application Data

(60) Provisional application No. 60/236,667, filed on Sep. 29, 2000, and provisional application No. 60/254,634, filed on Dec. 11, 2000.

(51) Int. Cl.[7] .............................. G02B 6/26; G02B 2/293
(52) U.S. Cl. .............................. 385/50; 385/14; 385/24; 385/27; 398/82; 398/42; 398/45; 398/48
(58) Field of Search ............................... 385/14, 16, 15, 385/24, 27, 39, 42, 50; 359/115, 124, 127; 398/42, 45, 48, 82

(56) References Cited

U.S. PATENT DOCUMENTS

| | | | |
|---|---|---|---|
| 4,592,043 A | 5/1986 | Williams | 370/3 |
| 4,695,121 A * | 9/1987 | Mahapatra et al. | 385/40 |
| 4,890,893 A | 1/1990 | Smoot | 359/124 |
| 5,002,350 A | 3/1991 | Dragone | 359/124 |
| 5,064,263 A | 11/1991 | Stein | 385/14 |
| 5,136,671 A | 8/1992 | Dragone | 385/46 |
| 5,414,548 A | 5/1995 | Tachikawa et al. | 359/130 |
| 5,446,579 A * | 8/1995 | Lomashevitch | 359/333 |
| 5,781,670 A | 7/1998 | Deacon et al. | 385/10 |
| 6,009,115 A | 12/1999 | Ho | 372/92 |
| 6,014,237 A | 1/2000 | Abeles et al. | 359/124 |
| 6,025,944 A | 2/2000 | Mendez et al. | 359/136 |
| 6,064,895 A | 5/2000 | Baumfalk et al. | 505/210 |
| 6,078,605 A * | 6/2000 | Little et al. | 372/94 |
| 6,101,300 A | 8/2000 | Fan et al. | 385/27 |
| 6,141,361 A | 10/2000 | Mears et al. | 372/20 |
| 6,411,752 B1 * | 6/2002 | Little et al. | 385/17 |
| 2001/0004411 A1 * | 6/2001 | Yariv | 385/28 |
| 2002/0094150 A1 * | 7/2002 | Lim et al. | 385/15 |

* cited by examiner

*Primary Examiner*—Brian Healy
*Assistant Examiner*—Kevin S. Wood
(74) *Attorney, Agent, or Firm*—William J. Burke

(57) ABSTRACT

One embodiment of the present invention is an exemplary wavelength selective optical coupling device. This exemplary device includes two waveguides, a ring or disc resonator, and resonator coupling elements. The waveguides are disposed on top of a substrate, not in contact with each other. The waveguides may transmit multiple wavelengths of light. The ring or disc resonator includes a dielectric member which extends parallel to the top of the substrate and overlaps, without contacting, the waveguides. The resonator is sized to resonate at a subset of resonant wavelengths. The resonator coupling elements couple the resonator to the substrate. The resonator coupling elements may include a bridge coupled to the top surface of the substrate and electrically coupled to control circuitry within the substrate. A waveguide coupling signal from the control circuitry causes the bridge to deform, translating the resonator up and down, thereby intermittently coupling and decoupling the waveguides.

37 Claims, 19 Drawing Sheets

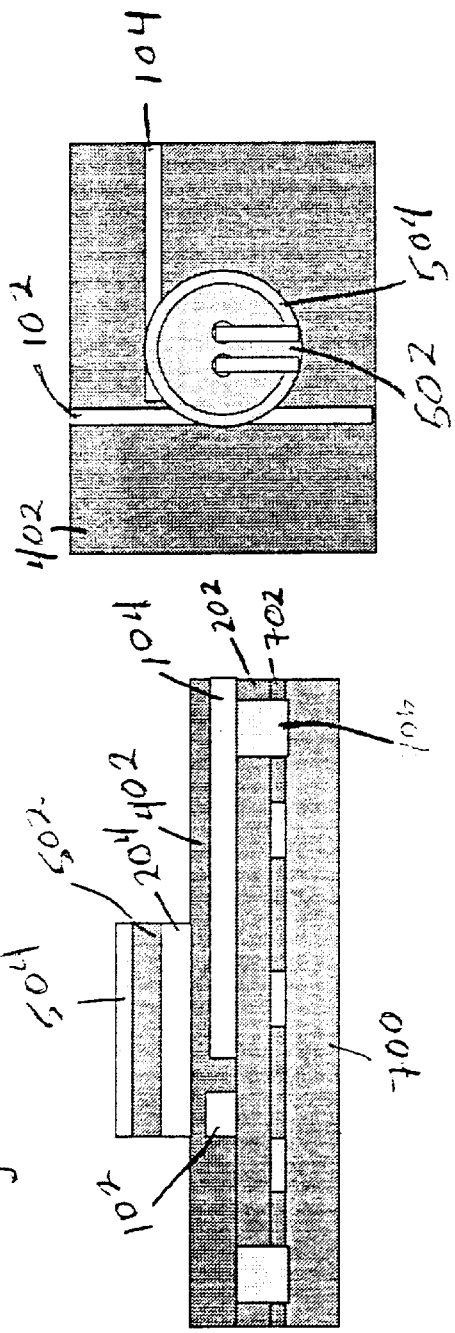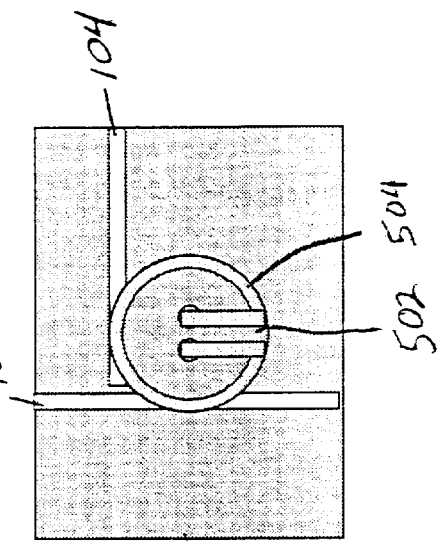

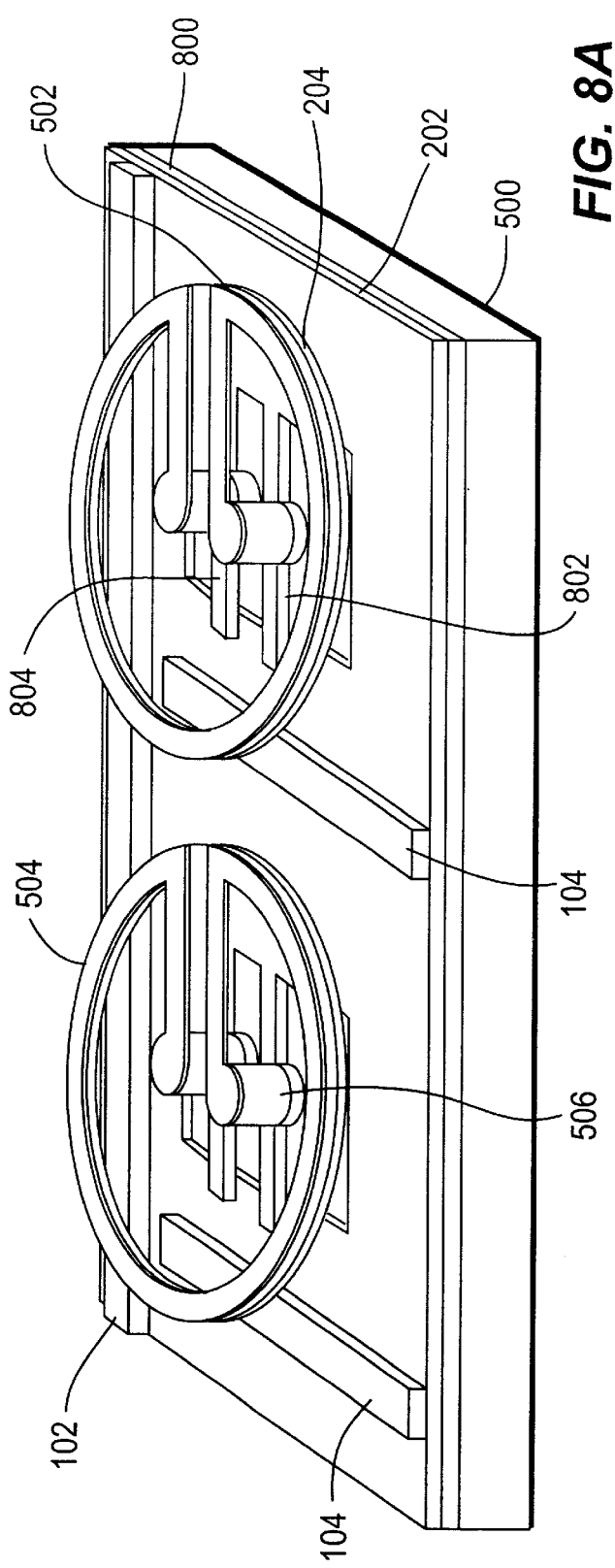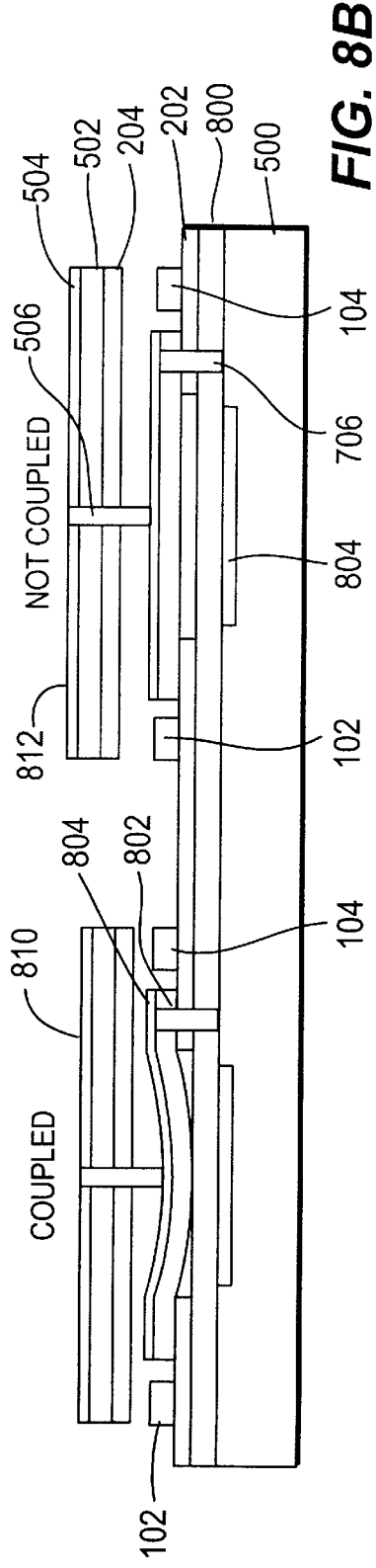

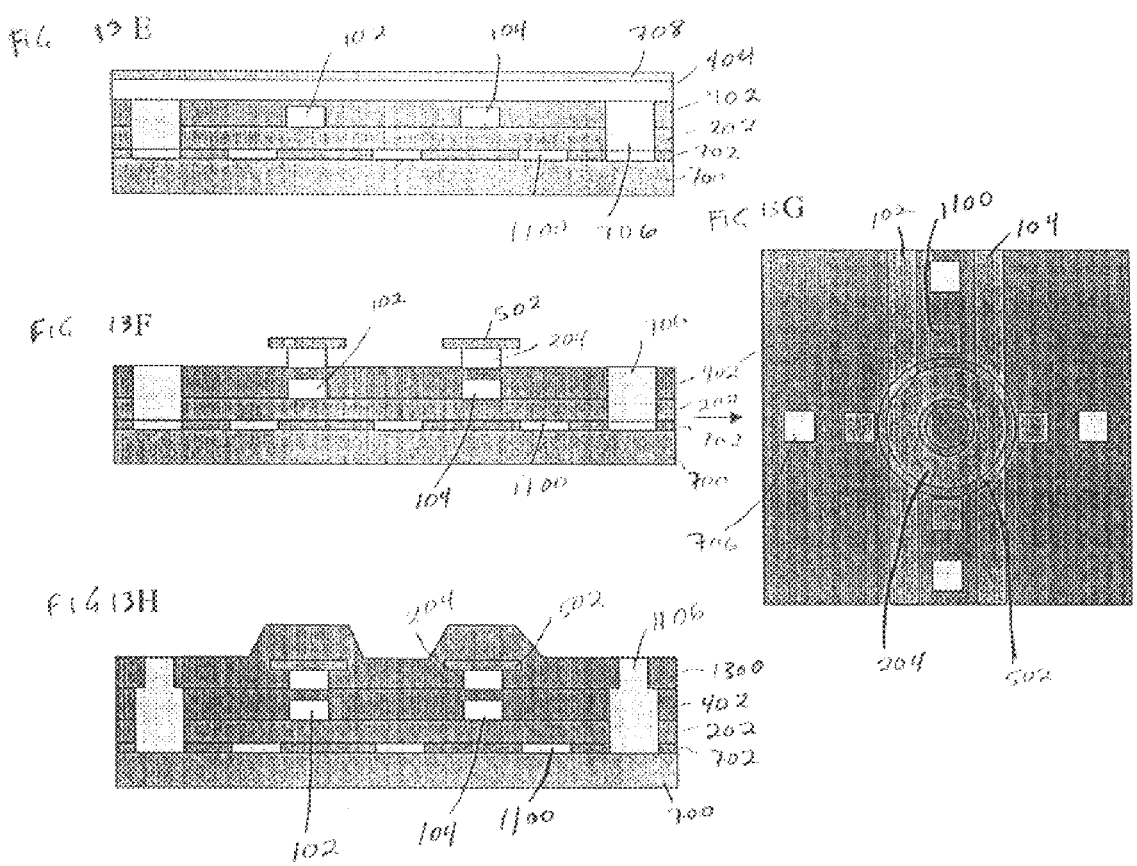

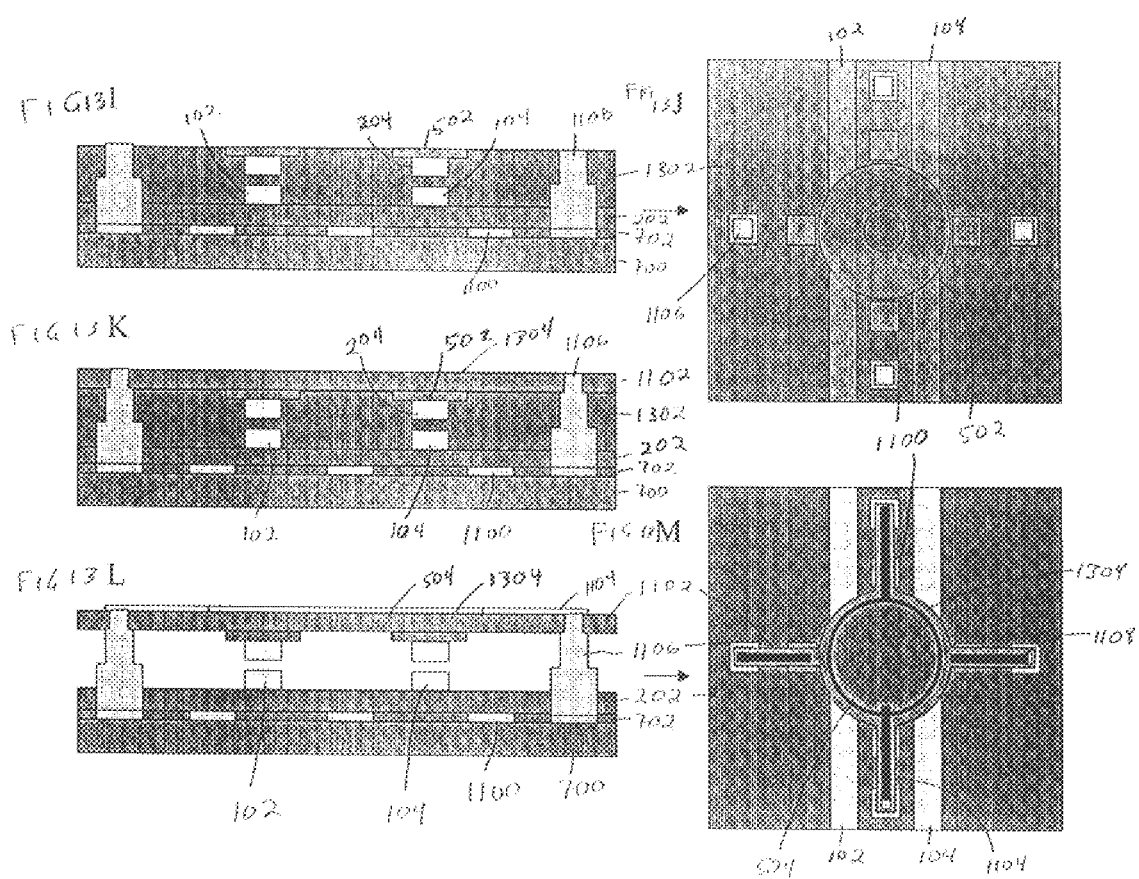

WAVELENGTH SELECTIVE OPTICAL ADD/DROP MULTIPLEXER AND METHOD OF MANUFACTURE

This patent application claims the benefit of priority from U.S. Provisional applications No. 60/236,667 filed Sep. 29, 2000 and No. 60/254,634 filed on Dec. 11, 2000.

FIELD OF THE INVENTION

The invention relates to wavelength selective opto-mechanical switching devices and methods of manufacture thereof. More specifically the invention relates to a micro-mechanical structure that employs ring resonator or disc resonator structures to implement multi-channel wavelength selective optical add/drop multiplexers.

BACKGROUND OF THE INVENTION

In multi-channel communication systems, it is desirable to provide a selective coupling mechanism. This allows signal channels to be added to lines and dropped from lines. It may also be desirable to provide for the splitting of a signal channel among multiple lines. To realize a large communications network, it may be desirable to provide arrays of such add/drop couplers and signal splitters and numerous separate communications lines for the various channels. Desirably these arrays may be packaged together as an integrated multiplexer/demultiplexer device, which is compact, has low loss characteristics, and creates little cross talk between channels.

Additionally, a multi-channel communication network desirably contains a plurality of controllable switching means to allow rerouting of data signals within the network. This allows the flow of signal channels to be interactively altered during operation.

It may be desirable for the functions of the add/drop couplers and signal splitters to be combined with controllable switching functions. This situation may be accomplished through the use of controllable add/drop switches and variable signal splitters. An array of such controllable add/drop switches and variable signal splitters may be seen as a simple, rapidly reconfigurable integrated multiplexer/demultiplexer device. Such a device may allow the data flow patterns within a communications network to be almost instantaneously changed.

Fiber optics communication systems provide a method of streamlining the communications lines. A single optical fiber can carry a number of separate communication channels, each channel operating bi-directionally at a different wavelength. The larger the number of wavelengths that may operate simultaneously within a fiber, the greater the capacity of the fiber.

Several factors determine what the maximum number of wavelengths operating in a single fiber can be. The first factor is the spectral range over which the fiber has a low enough loss and a high enough confinement factor to make transmission practical. The second factor is the spectral width of the laser sources used for the communications system and how much these spectra are broadened during transmission through the system. A third factor is the precision with which the channels may be separated from one another.

Providing a compact, highly discriminating, low loss multiplexing system for multi-wavelength optical communication systems has been very challenging. Some approaches that have been tried include; dynamically configurable gratings, prisms, or filters. While these means are perfectly adequate for many multiplexing systems, they suffer the drawback that the number of channels that the system may handle is limited because the wavelength dispersion of the demultiplexing means is not adequate to separate very closely spaced channels in devices of reasonable dimensions. Additionally, these approaches are not easily amenable to miniaturization.

Other wavelength multiplexers have been described in the literature. For example, frequency selective coupling means, i.e., evanescent couplers, have been proposed as an alternative to means that rely on dispersive properties of the multiplexer components. An evanescent coupler, in its simplest embodiment, uses at least two optical waveguides in such close proximity that the propagating mode of the second waveguide is within the exponentially decaying evanescent portion of the propagating mode of the first waveguide. The overlap couples optical energy into the second waveguide if the propagation constants, k, in the two guides are equal. If the values of k are equal at only a single frequency, only energy at that frequency is coupled while energy at other frequencies remains in the first guide. H. F. Taylor describes such a frequency selective coupling scheme in Optics Communications, 8, pp. 421–425, August 1973. The couplers described used optical coupling between two non-identical waveguides to couple the single optical frequency for which the propagation constants in the two guides are equal. Optical bandwidths of approximately several tens of Angstroms may be achieved in 1 cm long couplers thus theoretically permitting about 100 optical channels. These systems, however, are not readily controllable.

Micro-ring resonator couplers have been proposed for use in optical communications systems. One such micro-ring system is described in, S. T. Chu, et al., "An Eight-Channel Add-Drop Filter Using Vertically Coupled Micro-ring Resonators over a Cross Grid", IEEE Photonics Technology Letters, Vol 11, No 6, June 1999. In this work the authors describe the application of micro-ring resonators to add/drop filters. The add/drop filters are formed with a first layer containing a pair of waveguides which form a cross. A micro-ring resonator is disposed directly on top of the waveguides, near their intersection. The edge of the micro-ring resonator overlaps both waveguides allowing optical signals to be coupled from one waveguide into the ring and then from the ring into the other waveguide. This article is hereby incorporated herein by reference for its teaching on micro-ring resonators.

An array of micro-ring add/drop filters, as described by Chu, may provide static multiplexing and demultiplexing of numerous optical communication channels operating with narrow wavelength bands. This system may also be integrated into a compact package. The system described by Chu does not provide for dynamic reconfiguration of the filter array. Therefore, although this system contains many desirable advantages as a multi-wavelength optical multiplexer/demultiplexer for optical communication signals, it does not provide a fully dynamic integrated switching filter array for optical communications networks. Additionally, the intersecting of the waveguides in a filter array designed according to Chu may lead to scattering of the optical signals at the junctions, causing signal loss and/or undesired coupling (i.e. crosstalk) between the waveguides.

SUMMARY OF THE INVENTION

One embodiment of the present invention is an exemplary wavelength selective optical coupling device. The exemplary wavelength selective optical coupling device is formed on a substrate. In alternative embodiments of the present invention the substrate may include control circuitry.

A primary waveguide and a secondary waveguide are disposed on the top surface of the substrate separate from one another. The waveguides are each adapted to transmit a plurality of different wavelengths of light and each includes a portion for optically coupling to a ring or disc resonator. The resonator includes a dielectric member which extends parallel to the top surface of the substrate and overlaps, without contacting, the coupling portions of the two waveguides. The ring or disc resonator is sized to resonate at a subset of resonant wavelengths of the wavelengths of light transmitted in the waveguides.

In alternative embodiments of the present invention the resonator may further include an electrical heating element disposed on the upper surface of the dielectric member and means for applying an electric current to the electrical heating element, whereby the subset of resonant wavelengths of the ring or disc resonator may be tuned by the level of current applied to the heating element from control circuitry in the substrate.

Resonator coupling means for coupling the ring or disc resonator to the top surface of the substrate are also provided. In alternative embodiments of the present invention the resonator coupling means may include a bridge coupled to the top surface of the substrate and electrically coupled to control circuitry in the substrate. Control circuitry may be adapted to provide a waveguide coupling signal and the bridge adapted to deform in response to the waveguide coupling signal. This deformation of the bridge may be used to translate the resonator between a waveguide decoupled position and a waveguide coupled position. The ring or disc resonator is optically coupled to the primary waveguide and the secondary waveguide in the waveguide coupled position and substantially decoupled from at least one of the primary waveguides and the secondary waveguide in the waveguide decoupled position.

Another embodiment of the present invention is a multiwavelength optical multiplexer formed on a single substrate containing coupling control circuitry adapted to provide a plurality of waveguide coupling signals. A plurality of waveguides are disposed on the top surface of the substrate, each waveguide separated from the remaining waveguides. The waveguides are adapted to transmit the plurality of wavelengths of light. Also disposed on the substrate are a plurality of switchable wavelength selective optical couplers designed in accordance with the previously described embodiments of the present invention.

Another embodiment of the present invention is a method of manufacturing a wavelength selective waveguide coupling device according to the previously described embodiments of the present invention.

Another embodiment of the present invention is a method for encoding information as a narrow wavelength band digital optical signal. The method uses an integrated optical component including an optical source optically coupled to a first waveguide, a second waveguide, a ring or disc resonator sized to resonate in a narrow resonator wavelength band, a resonator translating means adapted to translate the resonator between a coupled position and a decoupled position, and control circuitry electrically coupled to the resonator coupling means. The control circuitry is adapted to form a digital electric signal in response to information provided to the integrated optical component.

The method includes several steps. The first is to operate the optical source, thereby providing optical radiation to the first waveguide. This optical radiation is characterized by a substantially constant amplitude and a source wavelength band which includes the narrow resonator wavelength band. The next step is to provide information to the control circuitry, so that it may be formed into a digital electric signal. This digital electric signal is then provided to the resonator translating means causing it to translate the ring or disc resonator between the coupled position and the decoupled position. Optical radiation in the narrow resonator wavelength band is then transferred from the first waveguide to the second waveguide only when the ring or disc resonator is in the coupled position, thus encoding the information as a narrow wavelength band digital optical signal traveling in the second waveguide.

One feature of several embodiments of the present invention is the use of micro electrical mechanical systems (MEMs) technology. This nanotechnology allows these embodiments provide high-speed, wavelength selective switching waveguide couplers, that may be integrated onto single integrated circuits, which may include the control and/or monitoring circuitry, as well as optical sources. Additionally, the degree of switching at each coupler may be accurately controlled, allowing signal splitting as well as add/drop switching.

It is to be understood that both the foregoing general description and the following detailed description are exemplary, but are not restrictive, of the invention.

BRIEF DESCRIPTION OF THE DRAWINGS

FIGS. 7A, 7B, 7C, and 7D are cut-away side plan drawings illustrating the manufacture of an exemplary wavelength selective waveguide coupler according the flowchart in FIG. 6.

FIG. 7E is a top plan drawing of the manufacture of an exemplary wavelength selective waveguide coupler shown in FIG. 7D.

FIG. 7F is a side plan drawing illustrating a finished exemplary wavelength selective waveguide coupler according the flowchart in FIG. 6.

FIG. 7G is a top plan drawing illustrating a finished exemplary wavelength selective waveguide coupler according the flowchart in FIG. 6.

FIG. 8A is a perspective drawing of an exemplary embodiment of wavelength selective waveguide couplers.

FIG. 8B is a cut-away side plan drawing of an exemplary embodiment of wavelength selective waveguide couplers.

FIGS. 13A, 13B, 13C, 13D, 13E, 13F, 13H, 13I, and 13K are cut-away side plan drawings illustrating the manufacture of an exemplary wavelength selective waveguide coupler according the flowchart in FIG. 12.

FIG. 13G is a top plan drawing of the manufacture of an exemplary wavelength selective waveguide coupler shown in FIG. 13F.

FIG. 13J is a top plan drawing of the manufacture of an exemplary wavelength selective waveguide coupler shown in FIG. 13I.

FIG. 13L is a side plan drawing illustrating a finished exemplary wavelength selective waveguide coupler according the flowchart in FIG. 12.

FIG. 13M is a top plan drawing illustrating a finished exemplary wavelength selective waveguide coupler according the flowchart in FIG. 12.

DETAILED DESCRIPTION OF THE INVENTION

With the increased demand for bandwidth within communications systems, it is desirable to be able to simultaneously transmit a high number of channels of data along a communications line. One approach to reaching this goal is the use of multiple wavelengths of light within an optical fiber, each wavelength carrying a separate signal. The number of separate wavelengths, or channels, that may be simultaneously transmitted is determined by two factors: the wavelength range over which the optical fiber can operate without unacceptable loss; and the minimum wavelength difference between channels that can be distinguished. Therefore, an integral part of such a system is a multiplexer/demultiplexer capable of separating the multiple wavelengths of light.

Figure 1:
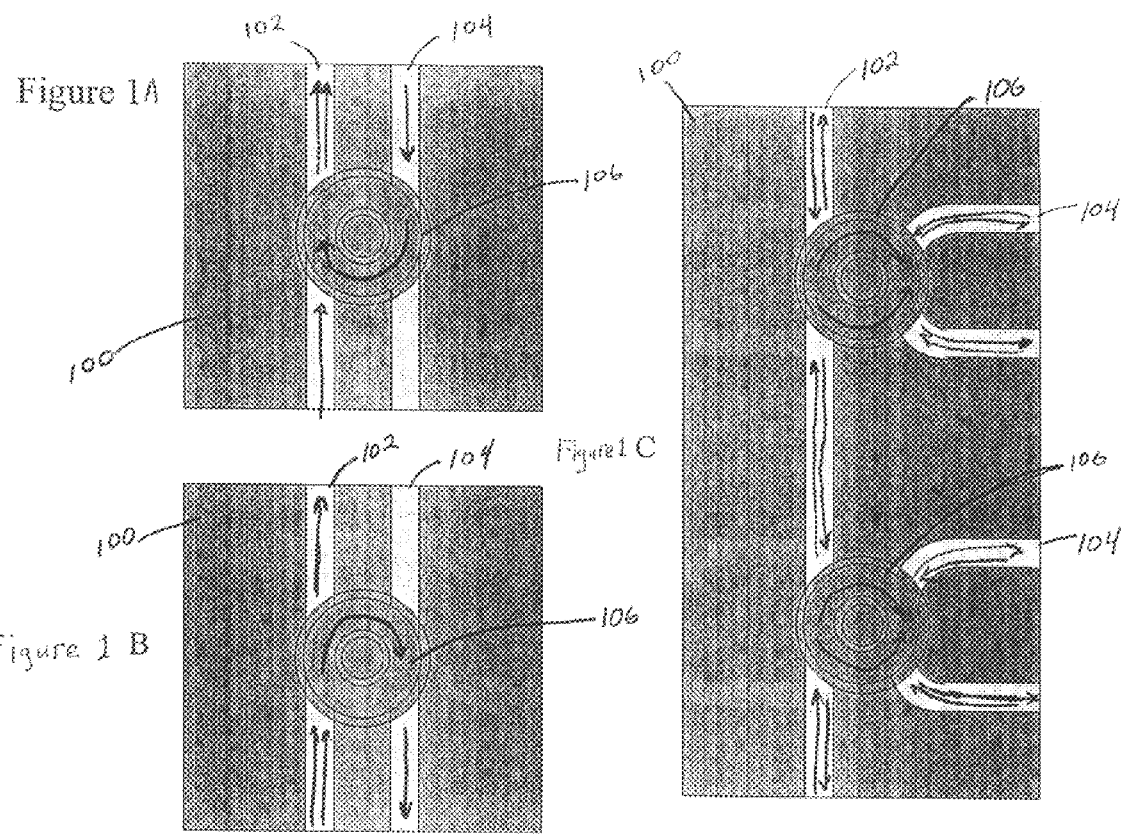
FIG. 1A is a top plan drawing of a wavelength selective waveguide coupler of the present invention, demonstrating its use as an add switch.
FIG. 1B is a top plan drawing of a wavelength selective waveguide coupler of the present invention, demonstrating its use as a drop switch.
FIG. 1C is a top plan drawing of two wavelength selective waveguide couplers, arranged as part of an add/drop multiplexer.

An embodiment of the present invention, illustrated in FIGS. 1A and 1B, is a wavelength selective optical coupler that may be used to couple at least one primary optical waveguide 102 to at least one secondary optical waveguide 104, both disposed on substrate 100. A ring or disc resonator 106 is used to optically couple the primary and secondary waveguides. The resonator contains a dielectric member which may be composed of a disc of optically guiding material, or a ring waveguide, or a combination thereof.

Figure 2:
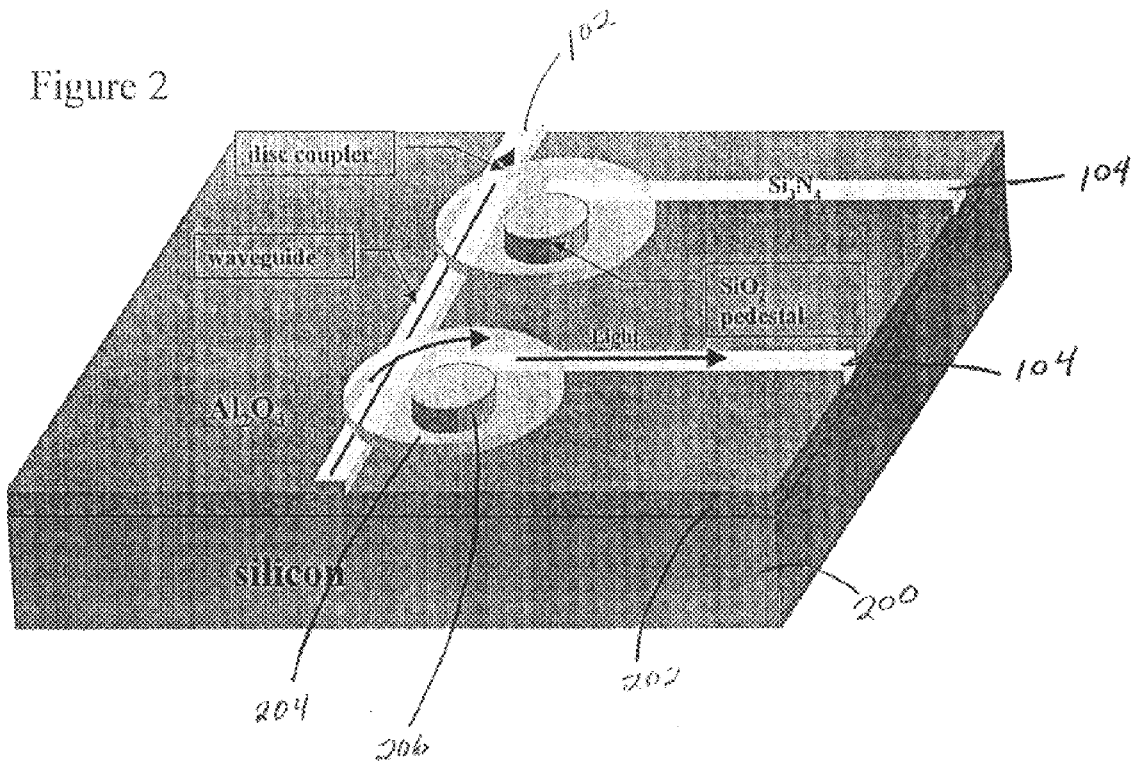
FIG. 2 is a perspective drawing of an exemplary embodiment of wavelength selective waveguide couplers.
Figure 5:
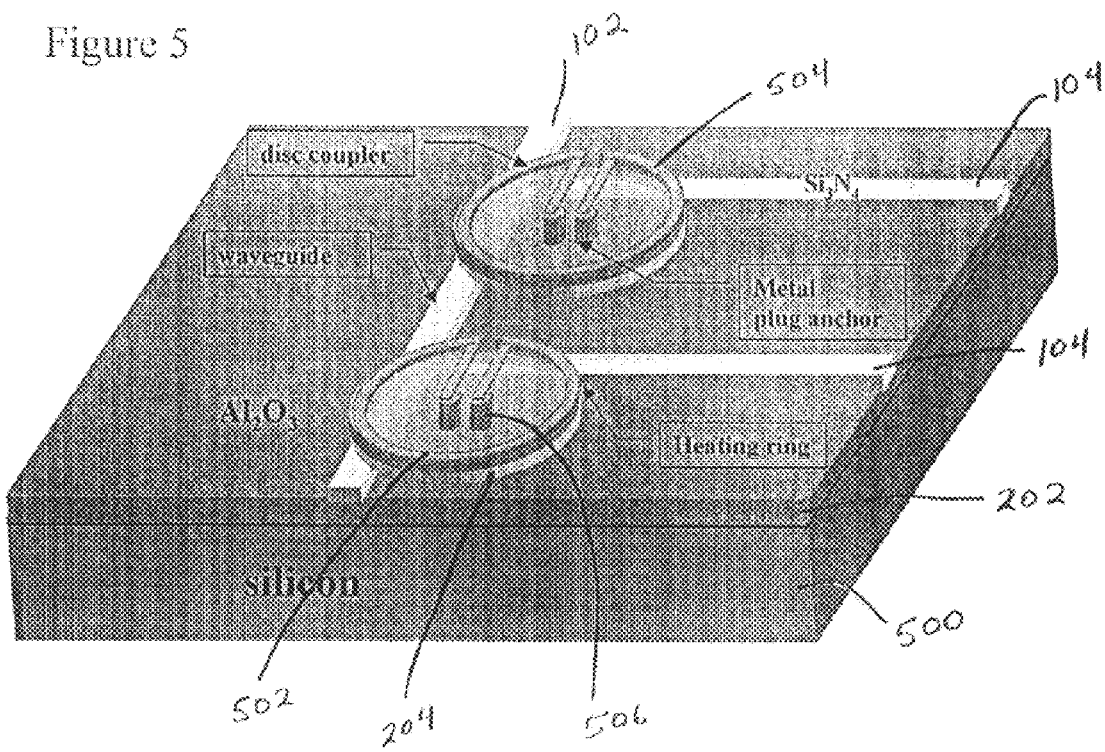
FIG. 5 is a perspective drawing of an exemplary embodiment of wavelength selective waveguide couplers.

The waveguides are shown as parallel structures in FIGS. 1A and 1B, but they also may be perpendicular to one another as in FIGS. 2, 5, and 8A. Techniques known to those skilled in the art may be used in the perpendicular case so that the waveguides may cross with negligible interaction. An example of such techniques is found in C. Manolatou et al. "High-density Integrated Optics", IEEE Journal of Lightwave Technology, Vol 17, No 9, September 1999.

The use of disc resonators in the present invention provides several advantages, such as low signal loss and precise wavelength selectivity. The disc resonators are operated in a whispering gallery mode. The circumference of the disc is ideally equal to an integral multiple of the wavelength to be in resonance. Therefore, the circumference of the disc determines the resonant wavelengths of the cavity, as well as the free spectral range, or wavelength difference between resonant whispering gallery modes. If the disc is large enough then the free spectral range may be smaller than the useful wavelength range of the optical fiber. Also, large discs may lead to large multiplexer/demultiplexers. Therefore it may be desirable to make the disc resonators as small as is practical.

The minimum size of the ring or disc resonators is determined by acceptable losses. As the size or the ring or disc decreases, the curvature of the light path increases. Therefore, it may be desirable that materials such as alumina, hydrogenated amorphous silicon carbide, silicon nitride, and silicon oxynitride which have a relatively high index of refraction be used to form the resonator. Also, to assist with the formation of curved surfaces of the resonator it may be desirable for the resonator material to be deposited as an amorphous layer to avoid preferential etching along crystal planes. By using sub-micron semiconductor fabrication techniques to improve surface smoothness, high finesse, low loss, optical ring or disc resonators may be fabricated, which may effectively select one wavelength channel out of a large number of wavelength channels.

Another consideration relating to the finesse of the ring or disc resonator is the means used to couple the resonator to the substrate. Pedestals 206 in FIG. 2 and metal plugs 506 in FIGS. 5 and 8 are desirably located in the center of the ring or disc resonators to avoid interacting with the mode volumes of the whispering gallery modes of the disc resonators, which is strongly located near the outer circumference of the resonator. Forming the resonator structure to include a ring waveguide and a disc cover layer may further ensure minimal scattering loss due to a central coupling means. The inclusion of a resonator cover layer is also desirable in the embodiment shown in FIG. 11 in which the ring or disc resonator is coupled on its outer edge to support arms 1102. The resonator cover layer may be formed to have a greater radius than the main resonator layer to reduce the mode strength along the outer circumference of the cover layer. Also an additional resonator overlayer with poor optical containment properties may be formed and the support arm connected to this layer.

The ring or disc resonators of the present invention are designed to selectively couple to evanescent optical fields that surround the waveguides. An evanescent optical field is the portion of the optical field of the light being guided by a waveguide that extends beyond the physical surface of the waveguide. The intensity of the evanescent optical field decays exponentially with distance outside the physical surface of the waveguide. The high finesse of the ring or disc resonators desirably employed in the present invention means that even relatively small evanescent optical field intensities are sufficient to couple signals between the waveguides, but only in relatively narrow ranges about the resonant wavelengths of the ring or disc resonators. Additionally, this use of evanescent coupling allows signals to be transferred between waveguides without physical contact between the waveguides and the ring or disc resonator(s).

In FIGS. 1A and 1B the ring or disc resonator 106 is shown extending over straight waveguides 102 and 104. Coupling occurs in the overlap regions. The positioning and orientation of the waveguides is not critical. The waveguides may be curved as in FIG. 1C or perpendicular to one another as in FIG. 2. It may also be desirable for the waveguides to be curved with a similar radius to the resonator to increase the overlap regions, and possibly increase the coupling.

The optical field is desirably strongly confined to the waveguides and the ring or disc resonator. Therefore, it may be desirable to have a significant difference in the indices of refraction between the waveguide layer and the substrate. Typical index changes may be in the range of 0.25 to 0.5. The resonator may also have a guiding layer and cover layer. Similar differences in indices of refraction between these layers may be desirable.

It is possible to perform full or partial switching of a signal with an exemplary wavelength selective optical coupler of the present invention. The resonators work by coupling small amounts of energy from the evanescent field. Due to the low losses within the resonator, the magnitude of the field in the resonator rapidly increases at the resonant wavelength, but not at other wavelengths. Any field in the resonator may interfere with the fields propagating in the waveguide. Off resonance, this effect is negligible, but at the resonant wavelength the field in the resonator may become large enough to completely stop the resonant signal from propagating in the waveguide past the switch. At the same time, the field within the resonator is also coupled to the other waveguide, where there may be no preexisting signal to interfere with this new signal, allowing the new signal to be transferred to the other waveguide. Equilibrium may be reached in which the same amount of energy is taken out of the original waveguide as is transferred into the other waveguide. Depending on the coupling and the finesse of the resonator, the percentage of energy transferred from one waveguide to the other at a given wavelength can range from 0% to 100%. If the transfer is 0% the signal continues unchanged in the original waveguide; 100% transfer creates a drop, or add, switch; and intermediate values allow the signal to be split. This last, signal splitting, scenario may be thought of as partially optically coupling the waveguides.

Typically, fiber optic communications systems use modulated light. The resonant ring or disc produces a phase delay in the modulation. Therefore, it may be desirable for the rate at which the field in the resonator builds up to be large relative to the modulation frequency. Light modulation in the multi-gigahertz and even terahertz range may be handled with only a negligible phase delay.

It is noted that a wavelength selective optical coupler of the present invention may operate as either an add switch or a drop switch, or it may operate as both simultaneously. FIG. 1A illustrates the exemplary wavelength selective optical coupler 106 being used as an add switch to couple an addition signal from the secondary waveguide 104 onto the primary waveguide 102. FIG. 1B illustrates the exemplary wavelength selective optical coupler 106 being used as an drop switch to remove a selected signal from the primary waveguide 102 and couple it to the secondary waveguide 104.

FIG. 1C is a top plan drawing of two wavelength selective waveguide couplers, arranged as part of an add/drop multiplexer which shows the wavelength selective waveguide couplers operating as both add and drop switches simultaneously. Also in FIG. 1C, the secondary waveguides 104 are shown curving after passing under the ring or disc resonators. This alternate embodiment allows multiple secondary waveguides to be placed on the same level of the multiplexer structure.

FIG. 2 is a perspective drawing of another exemplary embodiment of wavelength selective waveguide couplers which is adapted to provide multiple secondary waveguides by disposing the secondary waveguides 104 perpendicular to the primary waveguide 102. The optical switches shown in FIG. 2 are only capable of operating as add switches in one direction and drop switches in the opposite direction. By placing a second secondary waveguide parallel to the first secondary waveguide on the opposite side of the resonators it may be possible to provide a bi-directional add/drop switch similar to that shown in FIG. 1C.

FIG. 2 also illustrates a two layer substrate. The base substrate layer 200 may be silicon, as shown, or another semiconductor such as germanium, gallium arsenide, InP, InGaAs, or InGaAsP; an insulating material such as glass, alumina, or silicon carbide; or a combination of materials. This base layer may contain control circuitry. On top of the base layer 200 is passivation layer 202. This passivation layer, which may also be formed from a number of materials such as alumina, silicon carbide, and silicon dioxide, performs a number of functions. If the base layer contains circuitry, the passivation layer may provide protection and electrical isolation to the circuits. The passivation layer also creates a smooth surface upon which to deposit waveguides 102 and 104 and desirably provides an index of refraction differential on the bottom surface of the waveguides.

Additionally, FIG. 2 shows pedestals 206, functioning as spacing columns to elevate the resonators 106 above waveguides 102 and 104. The dielectric members of the resonators are shown as transparent discs in FIG. 2 to illustrate underlying structure.

In an alternative embodiment of the present invention, resonators may be connected in series or in parallel to create optical switches with filter characteristics similar to electronic filters formed using LC circuits. For example it is possible to provide an arrangement with one waveguide coupled by a resonator to second waveguide, which is in turn coupled by a second resonator to a third waveguide. This series arrangement of resonators may be designed to provide more precise wavelength selectivity or may be used to divide the signal among several waveguides. Alternatively two waveguides may be coupled by multiple ring or disc resonators of different radii. A parallel structure of this sort may be used to produce a flat top filter characteristic for an optical switch, or may allow several different channels to be transferred from one waveguide to another.

Figure 3:
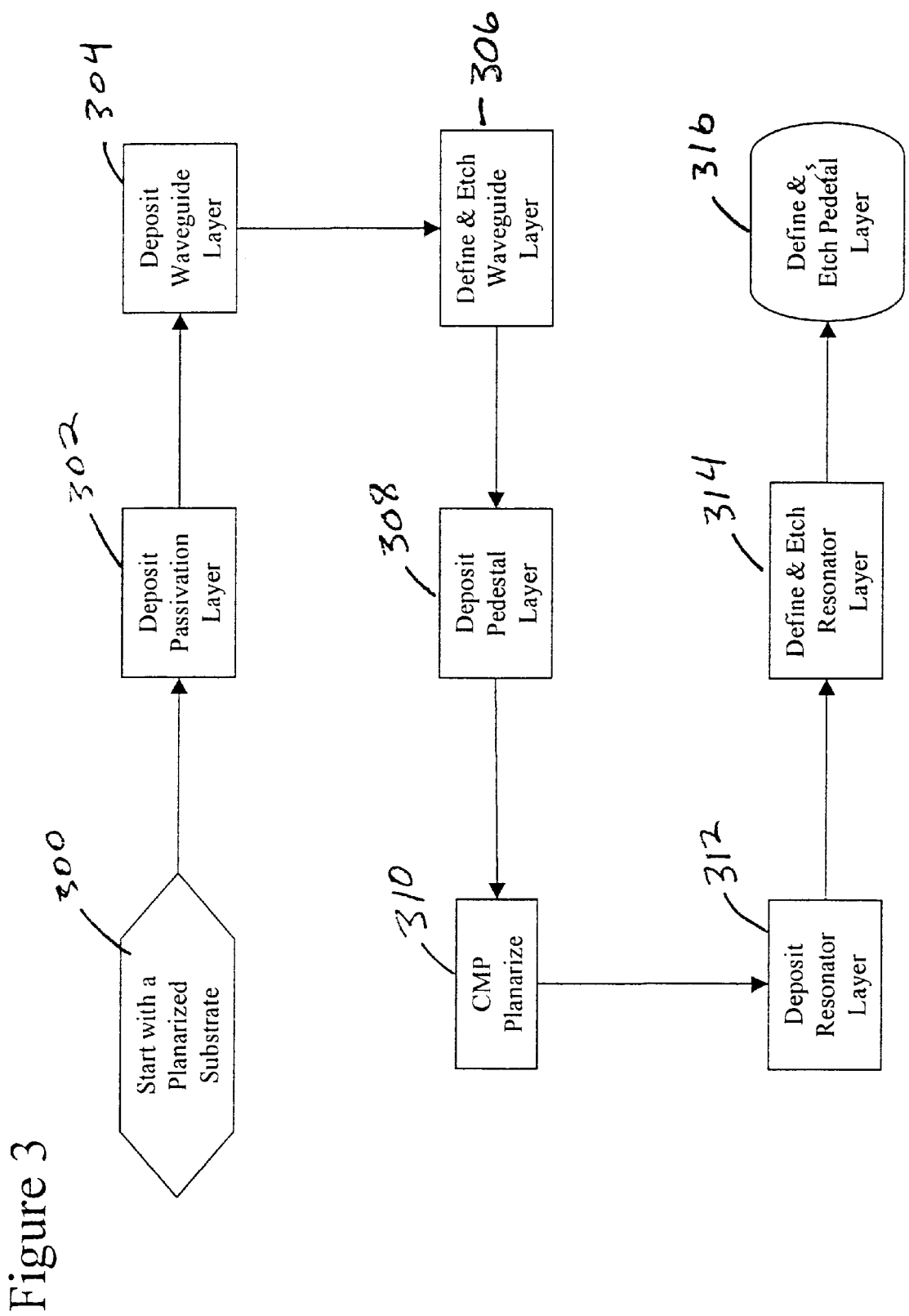
FIG. 3 is a flowchart of an exemplary method of manufacture of an exemplary wavelength selective waveguide coupler shown in FIG. 2.

FIG. 3 is a flowchart of an exemplary method of manufacture of an exemplary wavelength selective waveguide coupler shown in FIG. 2. FIGS. 4A–4D illustrate various stages of this process. The fabrication of the exemplary structure starts with a prepared semiconductor wafer, at step 300. The surface of semiconductor wafer 200 may be planarized by a suitable technique such as chemical-mechanical planarization (CMP).

The next step, 302, is to deposit passivation layer, 202. An exemplary passivation layer may be formed by sputtering alumina, $Al_2O_3$. $Al_2O_3$ has excellent optical properties in wavelengths commonly used for optical communication and an index of refraction of approximately 1.75 in this range.

Figure 4A:
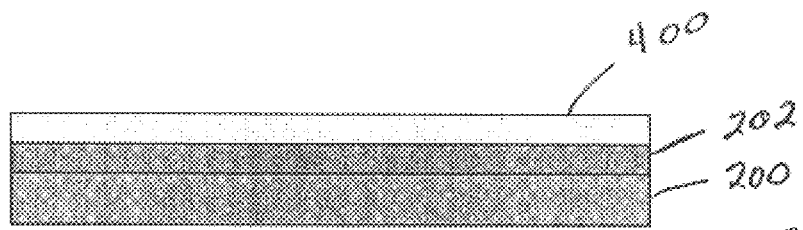
FIGS. 4A, 4B, and 4C are cutaway side plan drawings illustrating the manufacture of an exemplary wavelength selective waveguide coupler according the flowchart in FIG. 3.

The waveguide material is then deposited, step 304, using standard deposition methods, such as sputtering or plasma enhanced chemical vapor deposition (PECVD). FIG. 4A illustrates an exemplary wavelength selective optical switch at this point in the manufacturing process. Examples of the waveguide materials that may be used to form waveguide layer 400 include silicon nitride and silicon oxynitride, which have been shown to have excellent optical properties and an index of refraction varying from approximately 1.45 to approximately 2 depending upon the nitride content. High nitride content may desirably be used in order to keep the index of refraction in the range of 2 and to minimize the process interactions of the release process and the waveguide material.

Figure 4B:
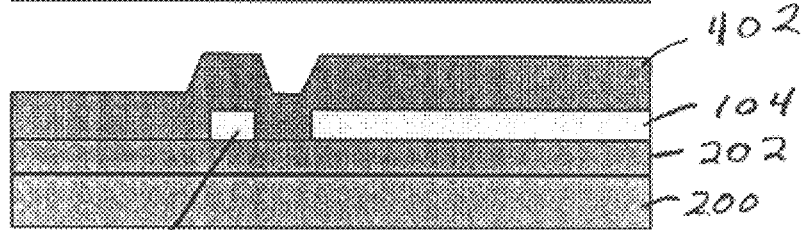

Next, at step 306, waveguides 102 and 104 are defined using standard lithography techniques and etched. Either dry or wet etching techniques may be used. It is contemplated that e-beam lithography may be used to increase reproduction precision and focused ion beam etching may be used for improved sidewall smoothness. A pedestal layer 402, also called a release layer, is deposited next, step 308. Pedestal 206 is formed from this layer, but it has the additional purpose of providing spacing between the waveguides and the resonators during manufacture. Pedestal layer 402 is desirably formed of a material that may be etched without harming the waveguides and ring or disc resonator(s), such as silicon dioxide. FIG. 4B illustrates an exemplary wavelength selective optical switch at this point in the manufacturing process.

Figure 4C:
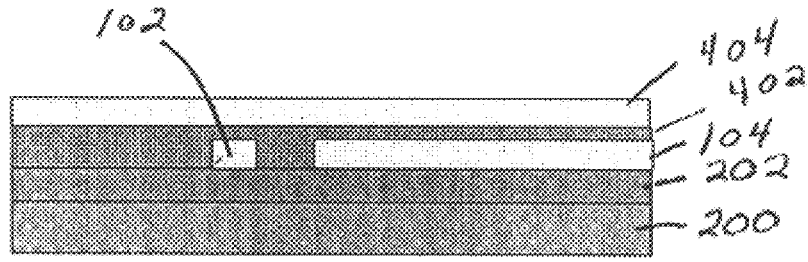

The next step, 310, is to CMP planarize the pedestal layer 402 to provide the desired spacing and smoothness for formation of the resonator. Once this planarization has been completed, resonator layer 404 is deposited, step 312. The resonator layer is often desirably formed from the same material and in the same manner as waveguide layer 400, though this is not necessary and may not always prove desirable. Use of the same materials for the waveguides and the resonator, however, may simplify the overall process and also maximize the coupling coefficient between the resonator and the waveguides. FIG. 4C illustrates an exemplary wavelength selective optical switch at this point in the manufacturing process.

Figure 4D:
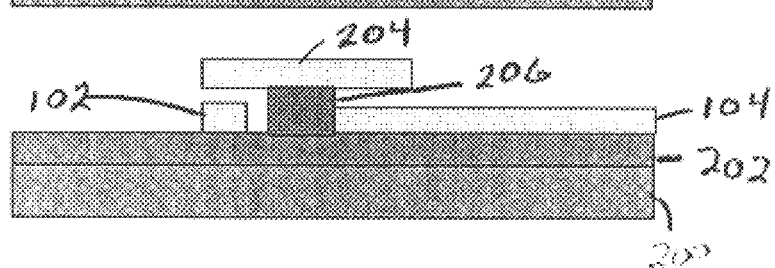
FIG. 4D is a side plan drawing illustrating a finished exemplary wavelength selective waveguide coupler according the flowchart in FIG. 3.

The next step, step 314, is to define and etch the resonator layer to form ring or disc resonator 204. This process may be accomplished in a manner similar to step 306, etching and defining the waveguide layer, particularly if the resonator and waveguide layers are formed of the same material. Finally the pedestal layer is etched, step 316, by wet chemical etching. Alternatively, the pedestal layer may be removed by a dry etch technique. In the case of wet chemical etch, buffered HF may be used. The pedestal layer is not completely removed in this exemplary embodiment. The pedestal layer material is desirably removed from around the waveguides and from underneath the outer portion of the resonator, but a pedestal, 206, is left in the center of the resonator disc, supporting the resonator above the waveguides. FIG. 4D illustrates a side plan view of a completed exemplary wavelength selective optical switch, also shown in FIG. 2.

Exemplary wavelength selective optical switches, described above with respect to FIGS. 2, 3 and 4A–4D, may be used to provide a network of static add/drop switches and/or signal splitters to multiplex or demultiplex multi-wavelength signals in a fiber optics communication system. FIGS. 5 and 7A–7G illustrate an alternative exemplary embodiment of the present invention, which further allows the resonant wavelength of the resonators to be dynamically tuned.

FIG. 5 is a perspective drawing of this alternate exemplary embodiment of the present invention. The wavelength selective waveguide coupler embodiment in FIG. 5 is similar to that shown in FIG. 2, but several additional, or changed, elements exist. The most obvious additions are heating element 504 and resonator cover 502. The resonator cover may provide additional mechanical strength to the resonator, particularly if dielectric member of resonator 204 is formed as a ring rather than a solid disc. Additionally, the resonator cover serves to confine light within the ring or disc resonator to minimize any light scattering that may occur from the heating element. Therefore, as described above regarding the indices of refraction of passivation layer 202 and waveguides 102 and 104, it is desirable for the resonator cover to have a significantly lower index of refraction than the resonator, desirably a difference in the 0.25 to 0.5 range.

Figure 11:
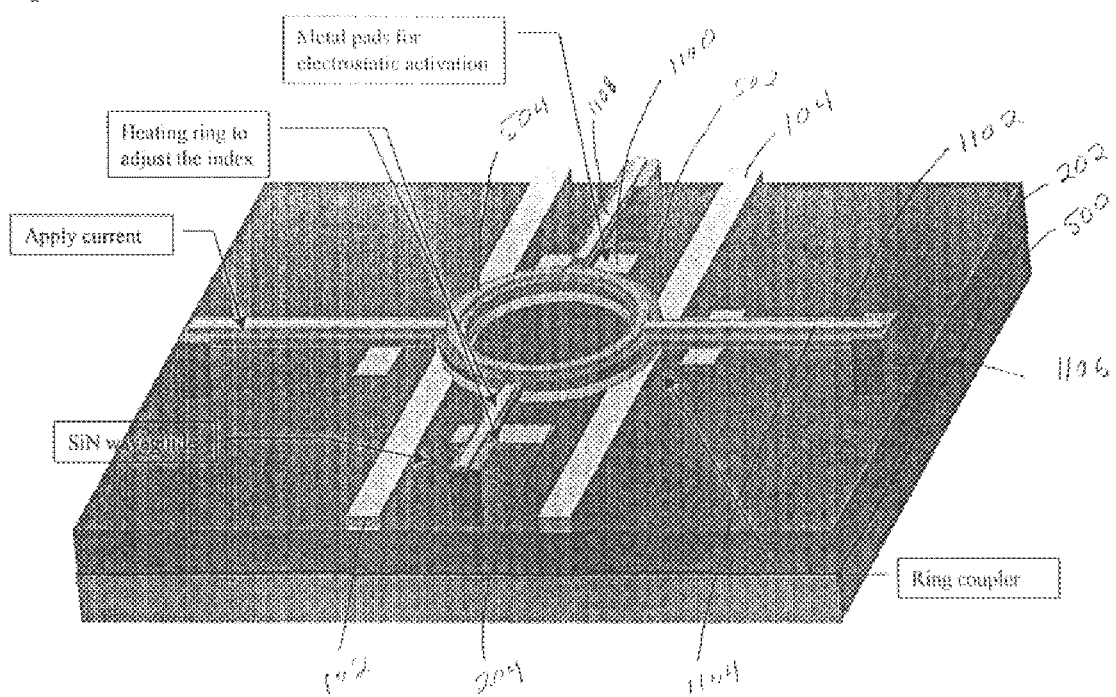
FIG. 11 is a perspective drawing of an exemplary embodiment of wavelength selective waveguide couplers.

The heating element has been added to allow for thermal tuning of the resonant wavelength of resonator 204. The heating element is formed of a high resistance metal or other material that may be used for resistive heating, such as titanium, tungsten, titanium-tungsten, or polysilicon, and is formed on top of the resonator cover. The heating element may be formed as a ring as shown in FIG. 5, or the heating element may be formed in another convenient shape. The heating element may also be formed as a solid disc if it is electrically connected to leads on opposing sides as shown in FIG. 11 or if it is heated by inducing eddy currents.

Exemplary resonator designs of the present invention are fairly thermally isolating. Therefore, a small amount of electrical power applied to the ring can induce a significant temperature change. The temperature change may be used to tune the index of resonator material, thereby allowing adjustment of the resonant wavelength. Typically, a variation of approximately one part in $10^5$ in the index of refraction per degree C. may be achieved. Such minute changes are normally adequate to allow compensation for variations in the etching the disc or small changes in the signal wavelength. Additionally the thermal change may induce a small change in the circumference of the resonator due to thermal expansion. Although the heating element is shown in FIG. 5 as a conductive ring receiving electrical power through metal plugs 506, it is contemplated that other methods such as radio frequency (RF) coupling or optical heating may be employed instead. These alternative heating methods may be accomplished by the reaction of the heating element to RF, or optical, signals generated by an RF, or optical, source formed within the substrate. Alternatively, the RF, or optical, source may be external to the integrated waveguide coupling chip. Also, a solid disc shape may be desirable for the heating element in the alternate embodiments incorporating RF or optical heating.

It is also contemplated that tuning between adjacent wavelength channels may be possible. This could allow for the creation of even more greatly reconfigurable multiplexer/demultiplexer arrays, capable of handling the routing of data within even more complicated optical communications networks.

Another difference between the embodiments of FIGS. 2 and 5 is that metal plugs 506 in FIG. 5 replace pedestal 206 from FIG. 2. Pedestal 206 in FIG. 2 is composed of the same material as the release material for ease of manufacture, But the metal plugs of FIG. 5 are formed of a separate conductive material in a separate step. A number of materials may be used to form the metal plugs, including tungsten, titanium tungsten, and polysilicon. The metal plugs may also be formed as plated plugs.

Figure 14:
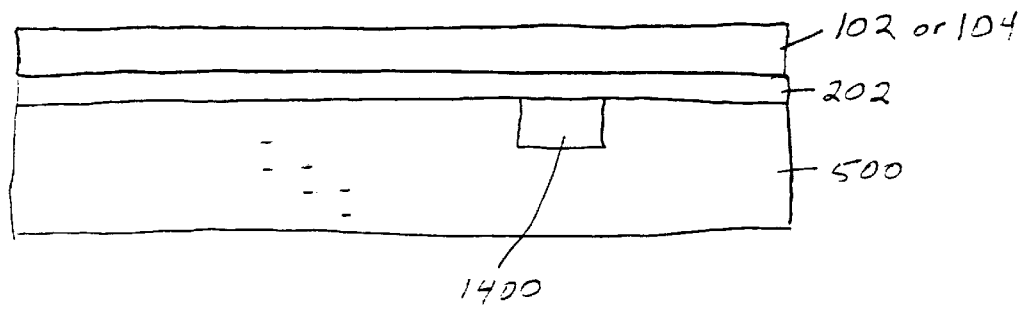
FIG. 14 is a cut-away side plan drawing illustrating an exemplary embodiment of an evanescently-coupled optical detector formed in a portion of an multi-wavelength optical coupler of the present invention.

The final difference is that the substrate base layer 200 in FIG. 2 has been replaced by integrated circuit layer 500 in FIG. 5. This allows control circuitry for resonant wavelength tuning to be provided directly underneath the optical couplers and connected to the heating elements by metal plugs 506. The integrated circuit layer may further include circuits such as detector circuits to monitor performance. If, for example, as illustrated in FIG. 14, amorphous germanium, or a similar optical detector material, is embedded into the integrated circuit, light from a desired waveguide may be coupled to an optical detector 1400 proximate to the waveguide though the passivation layer and formed of the optical detector material. The optical fields in the waveguides may penetrate a passivation layer, formed from materials such as alumina and silicon dioxide, to a depth of about one micron. Therefore, an evanescent field exists below the waveguide and that field may be detected. Consequently, the amorphous germanium detectors in the integrated circuit layer may detect the light level in the waveguides. Circuits can then monitor the light level and determine whether the switch has been tuned properly, providing sensing and control all on the same integrated circuit.

Figure 6:
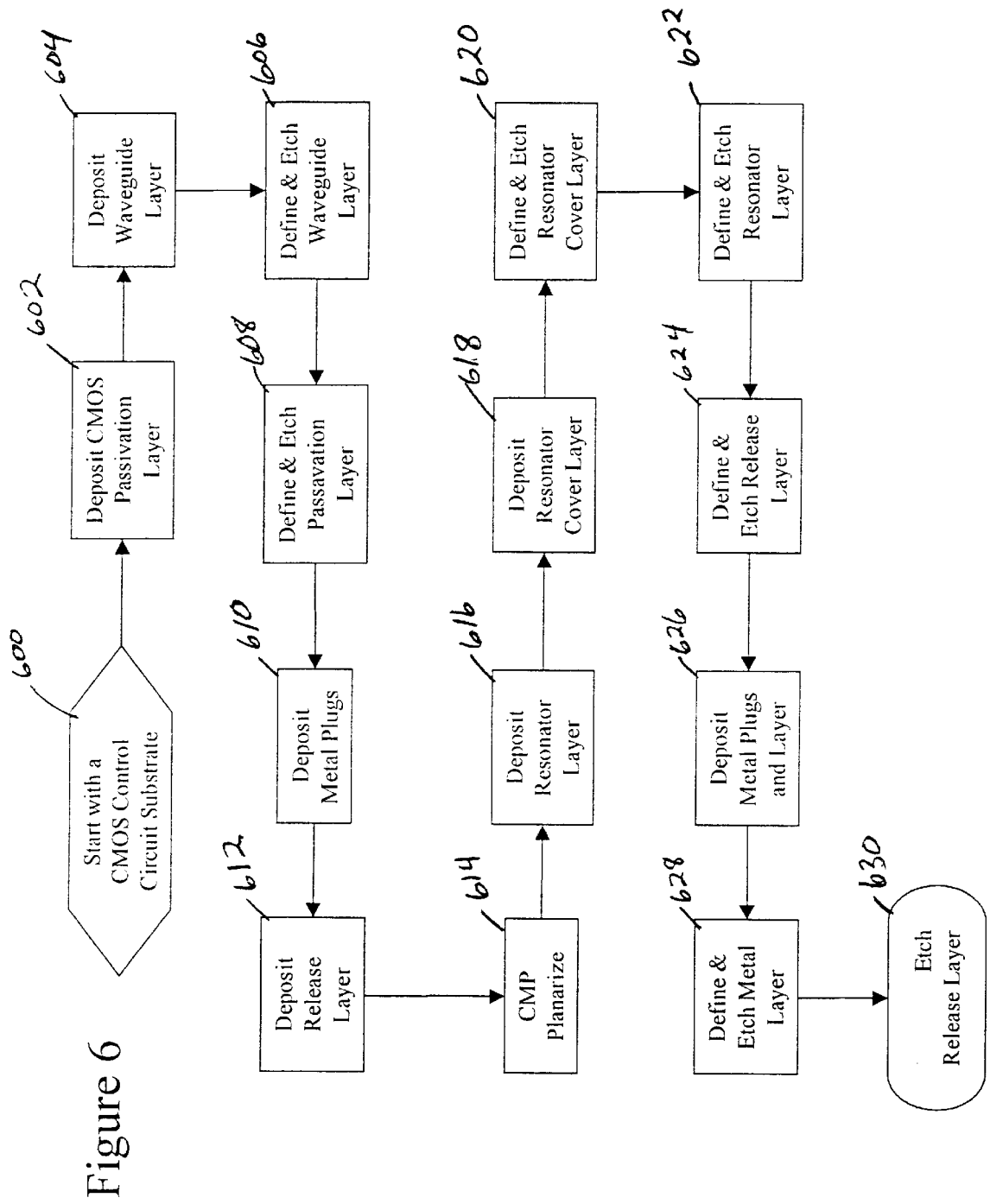
FIG. 6 is a flowchart describing an exemplary method of manufacturing the wavelength selective waveguide coupler shown in FIG. 5.

FIG. 6 is a flowchart describing an exemplary method of manufacturing the wavelength selective waveguide coupler shown in FIG. 5. This method of manufacture contains many of the same steps in the method of manufacture described above with regard to FIG. 3. The various materials used and processes described previously for those steps may be employed in the present embodiment of the present invention as well. FIGS. 7A–7G illustrate various stages of this exemplary process.

In fabricating the exemplary structure shown in FIG. 5, begins at step 600 with a substrate that includes previously formed CMOS control circuitry. Desirably, the CMOS control circuit substrate may include base circuit layer 700, planarized circuit layer 702 and contacts 704.

Figure 7A:
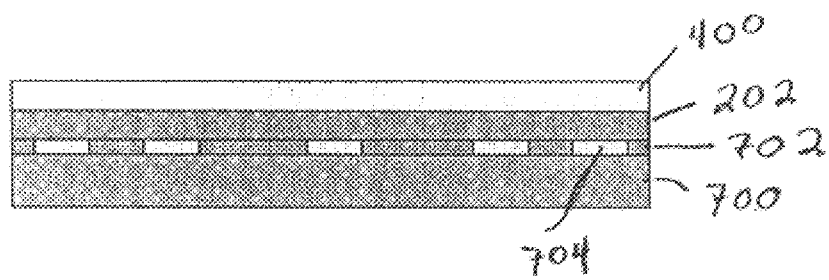

Next, CMOS passivation layer 202 is deposited, step 602, and waveguide layer 400 is deposited, step 604. FIG. 7A illustrates an exemplary wavelength selective optical switch at this point in the manufacturing process.

The two next steps are to define and etch waveguide layer 400 to form waveguides 102 and 104, step 606, and to define and etch passivation layer 202 to expose contacts 704, step 608. Contact plugs 706 are then deposited on the contacts to extend through the passivation layer, step 610. The contact plugs are desirably formed of the same material as metal plugs 506, but may be formed of any conductive material which does not react with the passivation material. The contact plugs in FIGS. 7B–7G are shown as being at positions which are not directly beneath the metal plugs, it is contemplated that the contact plugs may be directly beneath the metal plugs to simplify electrical coupling.

Figure 7B:
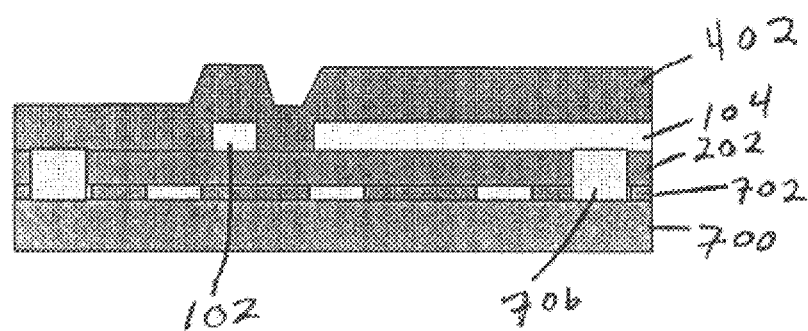

Following deposition of the contact plugs into the respective holes etched into the passivation layer, a release layer 402 is deposited over the device, step 612. FIG. 7B illustrates an exemplary wavelength selective optical switch at this point in the manufacturing process.

Figure 7C:
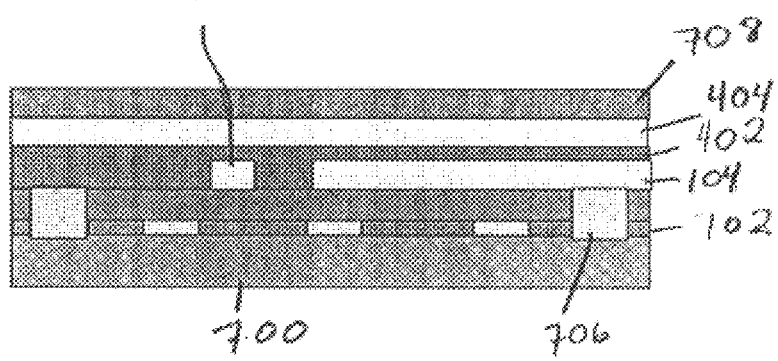

Next the release layer is CMP planarized, step 614, to provide a smooth surface on which to form the resonator. Resonator layer 404 is deposited on this surface, step 616. Next, the resonator cover layer is deposited, step 618. Resonator cover layer 708 may be formed from a number of materials such as alumina, silicon carbide, and silicon dioxide, and processed in a manner similar to the passivation layer. FIG. 7C illustrates an exemplary wavelength selective optical switch at this point in the manufacturing process.

The next step, step 620, defines and etches the resonator cover layer to form resonator cover 502 and to create vias for metal plugs 506. This is followed by step 622, defining and etching the resonator layer, to form resonator 204 and create vias for the metal plugs. The release layer is then defined and etched to complete the vias for the metal plugs, step 624. Next, at step 626, metal plugs 506 are deposited in the vias and a metal layer is deposited over the resonator cover. This layer is electrically coupled to the metal plugs. The metal layer may be formed of the same material as the metal plugs, or may be formed of a higher resistance conductor. The metal layer is then defined and etched to form heating element 504, step 628. FIGS. 7D and 7E illustrate an exemplary wavelength selective optical switch at this point in the manufacturing process.

The final step is to etch the release layer, step 630. This step may be performed in the same manner as the etching of the pedestal layer described above with regard to FIG. 3, thereby leaving a pedestal of the release material surrounding metal plugs 506. Alternatively, the etching may be continued until all of the release material has been removed and the resonator may be supported by the metal plugs. A dry etch release process may be desirable to avoid damage to the heating element and metal plugs. FIG. 7F illustrates a side plan view of a completed exemplary wavelength selective optical switch and FIG. 7G illustrates a top plan view of the same exemplary wavelength selective optical switch, also shown in FIG. 5.

If the metal plugs and contact plugs are not in direct contact an additional electrical coupler (not shown) may be added at this point.

Exemplary wavelength selective optical switches, described above with respect to FIGS. 5, 6 and 7A–7G, may be used to provide a network of add/drop switches and/or signal splitters to multiplex or demultiplex multi-wavelength fiber optics communications. A main waveguide 102 transmits a multi-wavelength signal past the resonators 204 of the two switches shown in FIG. 5, which resonators are tuned to respectively different wavelengths. Signals at the respective wavelengths may be coupled between respective branch waveguides 104 and the main waveguide 102 by moving the resonators 204 to selectively couple the main waveguide 102 to one of the branch waveguides 104. The resonant wavelength of the resonators 204 is determined, in part, by the diameter of the resonator. The resonant wavelength of these resonators 204 also may be dynamically tuned by circuitry contained within the substrates of exemplary multiplexer chips, possibly in response to detectors also contained within the substrates. This dynamic tuning may help insure that a desired level of coupling between waveguides within an exemplary multiplexer chip is maintained. Dynamic tuning of the resonant wavelengths may also be used to dynamically disengage certain of the add/drop and/or switchable splitters, by selectively tuning the resonant wavelengths of those ring or disc resonators to wavelengths between channels so that coupling to those waveguides is inhibited.

FIGS. 8A, 8B and 10A–10F illustrate an alternative exemplary embodiment of the present invention which allows an alternative method of engaging and disengaging exemplary wavelength selective waveguide couplers of the present invention.

FIG. 8A is a three dimensional drawing of an exemplary embodiment of the present invention, which allows dynamic control of the coupling and decoupling of individual resonators in an integrated structure. This exemplary embodiment incorporates semiconductor technology based MEMs structures along with exemplary micro-resonator structure, previously described above with respect to FIGS. 2 and 5, to form an exemplary dynamic add-drop optical switch. These exemplary switches can easily be extended to form large arrays, for example, to create an integrated multi-wavelength optical multiplexer/demultiplexer chip.

The ring or disc resonators of the present invention use evanescent coupling to establish a wavelength selective interconnection between the primary waveguide and the secondary waveguide. The strength of the evanescent coupling between a resonator and a waveguide is exponentially dependent on the distance between the resonator and the waveguide. If the coupling is not large enough, then the field in the resonator can not build up to the point where appreciable energy transfer may take place between the waveguides. By bringing the resonator disc close enough to the waveguides, sufficient coupling may occur, allowing the field to build up inside the resonator and complete energy transfer to take place from the primary waveguide to the resonator and then from the resonator to the secondary waveguide, but only at a selected wavelength.

The exemplary embodiment illustrated in FIGS. 8A and 8B includes a pair of bridges 802 which allow the resonators 204 to be moved into an optically coupled position, as shown by coupled resonator 810 in FIG. 8B, when sufficient force is applied to deform the bridges. When the force is removed, the tensile state of the released device cause it to move up, away from the waveguides, optically decoupling waveguides 102 and 104 from the resonator. Decoupled resonator 812 in FIG. 8B illustrates the pair of bridges in their relaxed, undeformed state. Due to the exponential nature of the evanescent field coupling used in the present invention, the vertical movement required to turn this exemplary wavelength selective optical switch on and off is approximately 0.2 microns to 0.5 microns. Although FIG. 8B illustrates an exemplary wavelength selective optical switch in which the bridges flex downward to engage waveguide coupling and the relaxed state of the switch is the off position, one skilled in the art may also form the bridges so as to flex upward to disengage waveguide coupling and have the switch in the on position when the bridge is relaxed.

The material and shape of the bridges should be chosen to provide sufficient elasticity for the required movement of the resonator. Although the bridges may be formed of the same material as the waveguides to simplify manufacture, as in the exemplary method of manufacture illustrated in FIG. 9, it is contemplated that numerous other materials, such as alumina, tungsten, titanium, or titanium-tungsten, may be used as well. The bridges may be deformed by electrostatic attraction between bridge electrodes 804 and substrate electrode 808. The deformation results in a vertical movement of the resonator, moving the resonator into and out of coupling range with the waveguides, thereby establishing optical communication between the primary and secondary waveguides through the resonator. The bridges are fabricated as an integral part of an integrated circuit chip, along with the waveguides and coupling rings, so that precise movement can be controlled and no discrete moving parts are used. This assures high reliability and long lifetime of the optical switch and permits precise control of the switching.

It is also contemplated that the bridges may be formed as a bi-material structure with one material on top of the other, whereby the bridge may be deformed under the application of heat due to a difference in the coefficient of thermal expansion between the two materials. The heat may be applied by resistive heating using either direct current or RF heating, or by optical heating. The small thermal mass of the bridges and high relative surface area means that the bridges may return quickly to ambient temperature, and their relaxed position, once the heat is removed, allowing for rapid switching. In this embodiment there is no need for substrate electrode 808. Another embodiment of the bridges involves the use of a piezoelectric material as one of the bi-material layers. Instead of heating the bridge to deform it, the bridge in this embodiment is deformed due to expansion and contraction of the piezoelectric layer relative to the non-piezoelectric layer by the application of an electric potential. Electrostriction is another method by which a bimaterial bridge may be deformed. If strains are introduced in one layer during manufacture, deformation of the structure may be controlled by application of electric potential to a second electrostrictive layer. It is also possible to make the device mechanically latching.

In a further exemplary embodiment of the present invention, the resonator may be brought into an engaged or "on" condition by the use of a single bridge, a diaphragm, or a flexible member such as a cantilever connected at only one end, rather than the dual bridge structure illustrated in FIGS. 8A and 8B. Additionally, a bridge structure may be designed to provide motion parallel to the substrate surface rather than perpendicular to the surface. This motion parallel to the substrate surface, or the tilting motion that may occur in the cantilever embodiment may allow the resonator to be optically decoupled from one waveguide while remaining optically coupled to another waveguide. The dual bridge structure of FIGS. 8A and 8B may also allow tilting motion. These possible alternative features may provide for faster signal switching or more complex multiplexer reconfiguration possibilities.

It is also noted that, although the exemplary device illustrated in FIGS. 8A and 8B contains both bridges for dynamic switching and a heating element for dynamic tuning of the resonators, either of these features may be added, individually, to the wavelength selective optical coupler of FIG. 2. The bridges may be formed of a single material in the electrostatic embodiment, as they support the pedestals on which the discs rest. The pedestal on which it sits may be a metal member formed by anchor plug technology. Anchor plug technology is a standard semiconductor technology technique.

Figure 9:
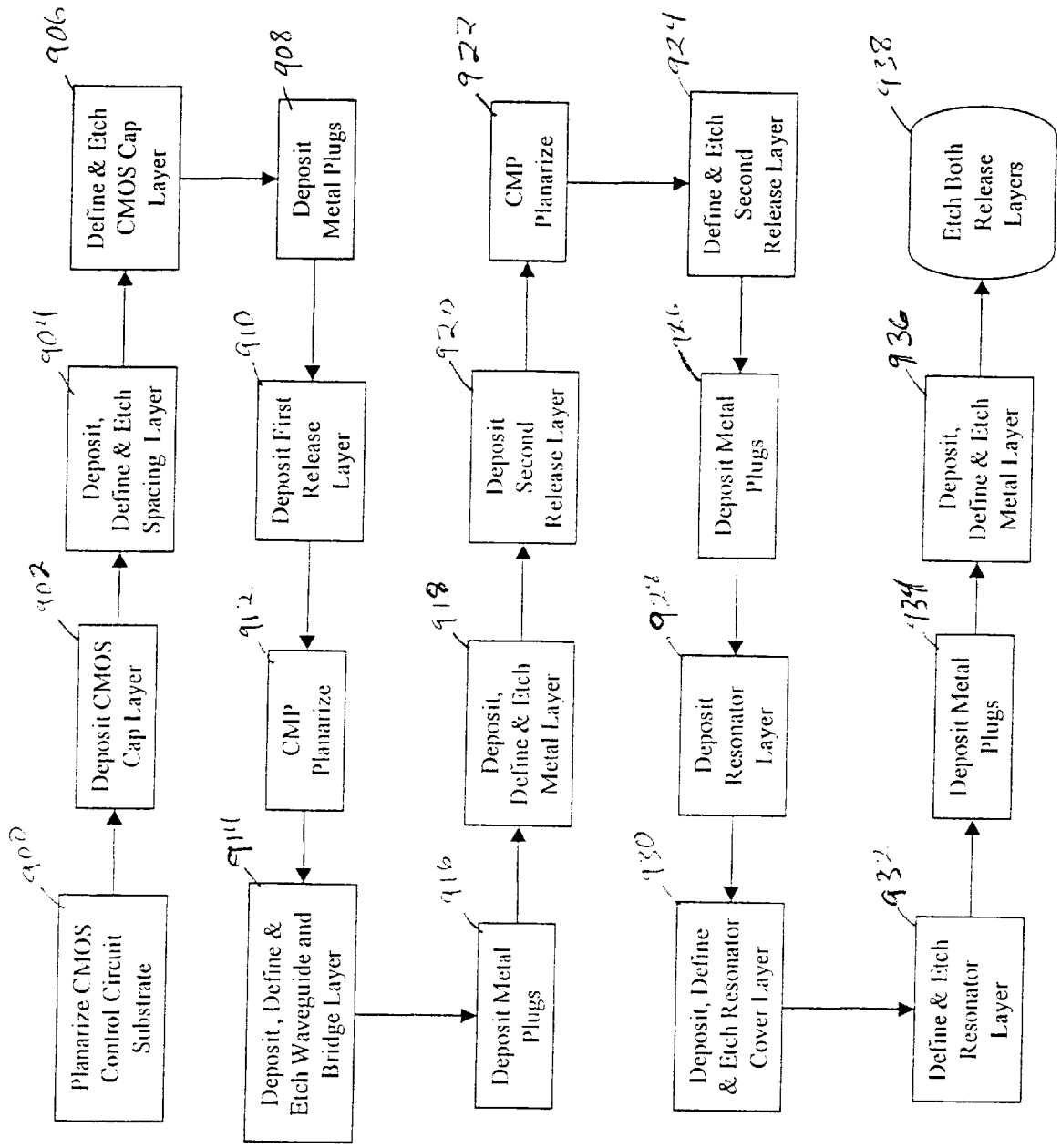
FIG. 9 is a flowchart describing an exemplary method of manufacturing the wavelength selective waveguide coupler shown in FIG. 8.

FIG. 9 is a flowchart describing an exemplary method of manufacturing the wavelength selective waveguide coupler shown in FIG. 8. This method of manufacture contains many of the same steps as the exemplary methods of manufacture described above with regard to FIGS. 3 and 6. The various materials used and processes described previously for those steps may be employed in the present embodiment of the present invention as well. FIGS. 10A–10F illustrate various stages of the present exemplary process.

The fabrication of the exemplary structure shown in FIG. 8 starts at step 900 with a CMOS control circuit substrate. This substrate contains previously formed control circuitry. The exemplary CMOS control circuit substrate 500 is a semiconductor substrate that has been processed using conventional CMOS IC techniques and is desirably planarized. The control circuitry may include both MEMs control circuitry to allow the resonators to be dynamically coupled and decoupled and tuning circuitry to dynamically tune the resonant wavelengths of the resonators. The CMOS control circuit substrate may also include detectors and detector circuitry to monitor signals within the various waveguides. A CMOS control circuit substrate that includes portions of appropriate semiconductor material, such as InP, InGaAs, or InGaAsP, may additionally contain integral signal amplifiers or laser sources.

Figure 10A:
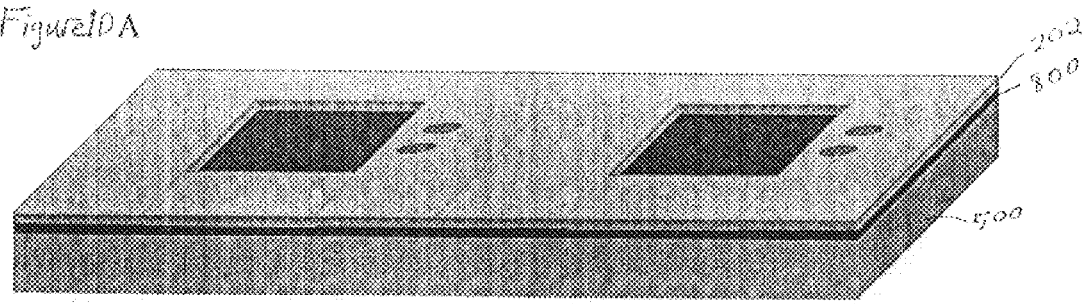
FIGS. 10A, 10B, 10C, 10D, 10E, and 10F are perspective drawings illustrating the manufacture of an exemplary wavelength selective waveguide coupler according the flowchart in FIG. 9.

CMOS cap layer 800 is deposited on top of the CMOS control circuit substrate, step 902, to protect the circuitry from further processing steps. The CMOS cap layer may be formed of any of a number of materials including silicon carbide. Next, spacing layer 202 is deposited, defined, and etched, step 904. The spacing layer may be formed and processed similarly to the CMOS passivation layer described above with reference to FIG. 6. The etching includes vias for contact plugs 706, as well as openings to allow the bridges to deform during operation of the MEMs structure. Next, the CMOS cap layer is defined and etched to complete the vias for the contact plugs, step 906. FIG. 10A illustrates an exemplary wavelength selective optical switch at this point in the manufacturing process.

Figure 10B:
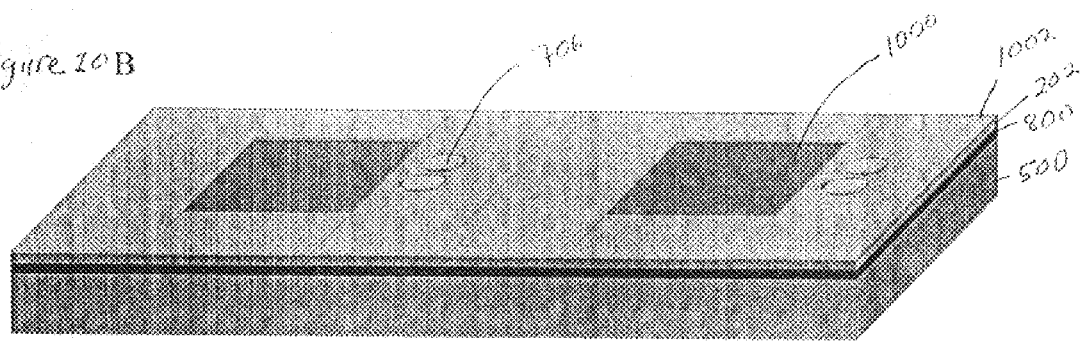

Contact plugs 706 are then deposited to extend through the spacing layer and the CMOS cap layer to provide electrical coupling to the circuitry in the CMOS control circuit substrate, step 908. This is followed by deposition of the first release layer, step 910. First release layer 1000 is then CMP planarized, step 912, so that it is completely removed from the surface of spacing layer 202 and the contact plugs. The CMP planarization method used desirably takes into account the various materials to be exposed. One function of this process step is to provide a sufficiently smooth surface on the spacing layer for deposition of waveguide and bridge layer 1002. The next step is to deposit, define and etch the waveguide and bridge layer, step 914. FIG. 10B illustrates an exemplary wavelength selective optical switch following the deposition of the waveguide and bridge layer.

Figure 10C:
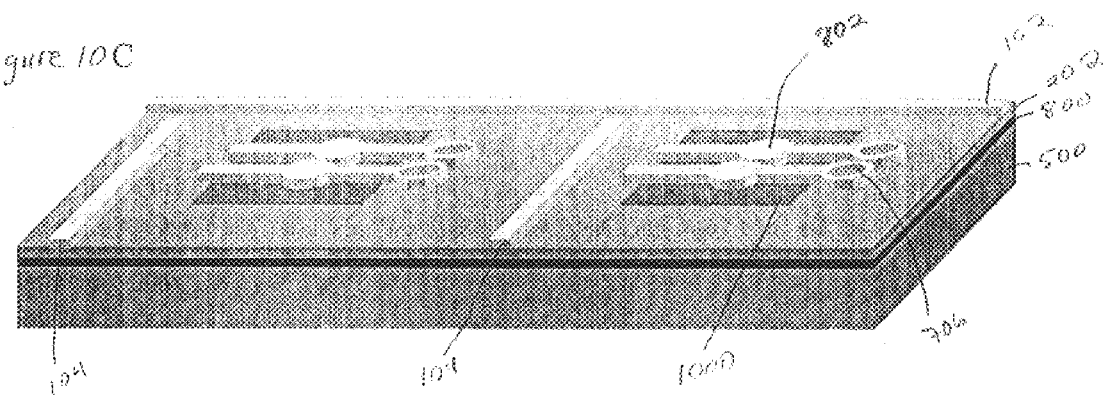

The etching of the waveguide and bridge layer forms waveguides 102 and 104 and bridges 802. The next step, step 916, is deposition of the contact plugs through vias etched in bridges 802. FIG. 10C illustrates an exemplary wavelength selective optical switch at this point in the manufacturing process.

Figure 10D:
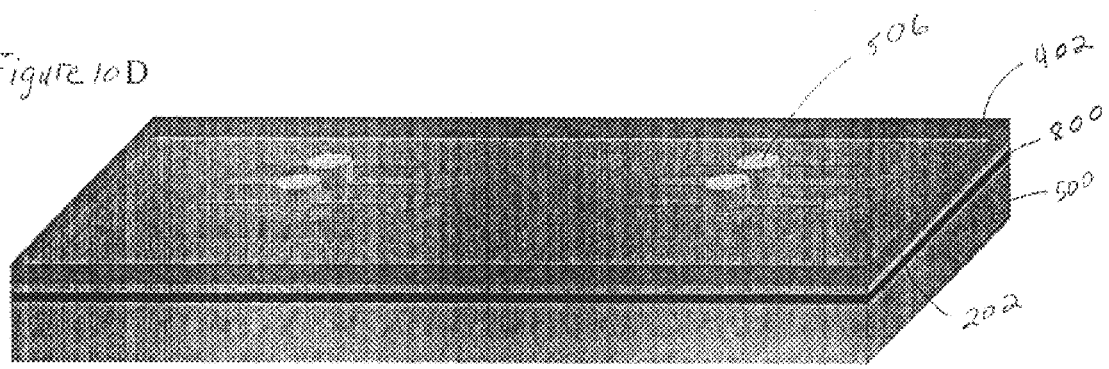

This is followed, at step 918, by depositing, defining, and etching bridge electrodes 804. Second release layer 402 is then deposited over the device, step 920. Next the second release layer is CMP planarized, step 922, to provide a smooth surface for forming the resonator. The second release layer is then etched, at step 924, to create vias for metal plugs 506 and the metal plugs are deposited, at step 926. Step 922 may be performed following step 926 instead of following step 920. This alternate order may provide a superior surface for deposition of the resonator material 404, but may also require a more complicated CMP method. FIG. 10D illustrates an exemplary wavelength selective optical switch at this point in the manufacturing process.

Figure 10E:
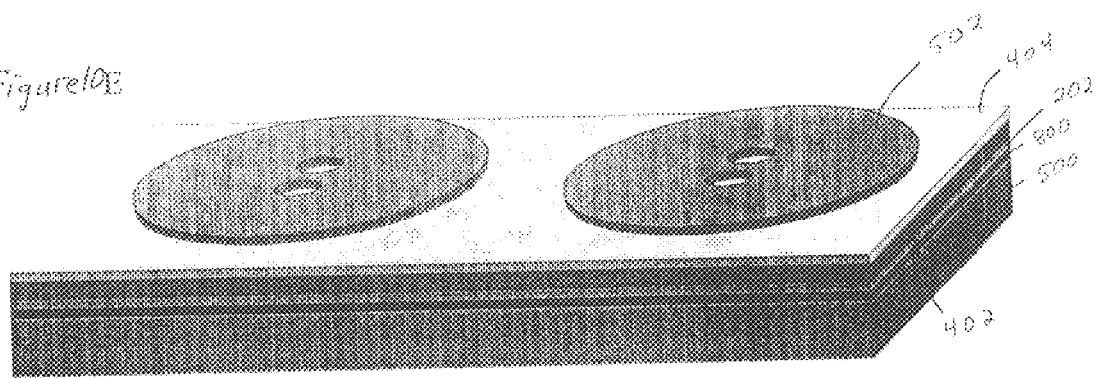

Resonator layer 404 is deposited on the CMP planarized surface, step 928. Next, the resonator cover layer is deposited, defined and etched, step 930, forming resonator cover 502. FIG. 10E illustrates an exemplary wavelength selective optical switch at this point in the manufacturing process.

Figure 10F:
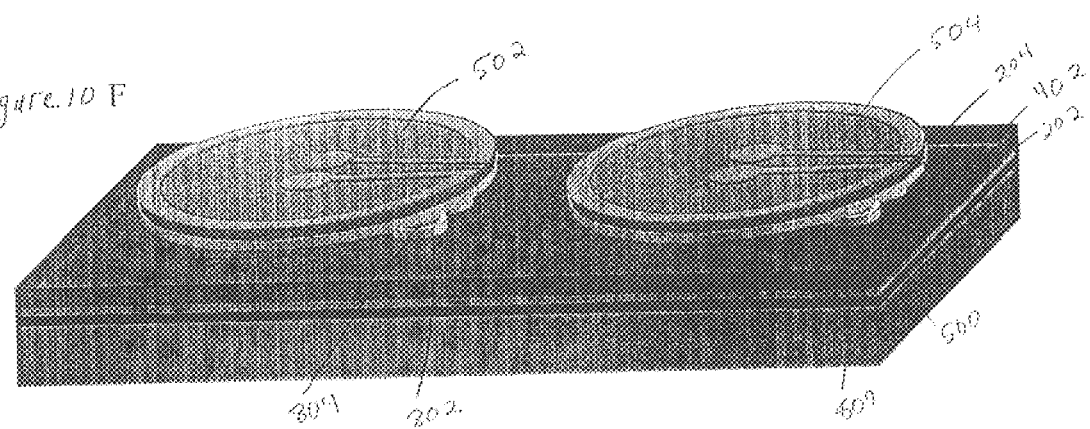

This is followed by step 932, which defines and etches the resonator layer to form resonator 204. Next, metal plugs 506 are deposited in vias through the resonator and resonator cover, step 934. A metal layer is deposited over the resonator cover, electrically coupled to the metal plugs and then defined and etched to form heating element 504, step 936. FIG. 10F illustrates an exemplary wavelength selective optical switch at this point in the manufacturing process.

The final step is to etch both release layers, step 938. A dry etch release process may be desirable to avoid damage to the heating element and metal plugs. Complete removal of the first release layer from beneath the bridges 802 is desirable. FIG. 8A illustrates a perspective view of a completed exemplary wavelength selective optical switch and FIG. 8B illustrates a side plan view of a completed exemplary wavelength selective optical switch.

Another exemplary embodiment of the present invention is illustrated in FIG. 11. In this exemplary embodiment a silicon technology based MEMs structure including a micro-ring resonator 204, with wavelength-scale dimensions, a pair of optical waveguides 102 and 104, and two or more supporting arms 1102 connecting to the micro-ring resonator is formed. Though, the dielectric member of the ring resonator in FIG. 11 is illustrated as a ring waveguide, it may also be formed as a disc. The use of a dielectric disc may increase the mechanical stability of the ring resonator. During deformation the supporting arms may introduce stresses on the ring resonator, which may cause the resonator to deform into a cup-like shape, known as cupping. This cupping may be discouraged by a solid overlayer, or a dielectric disc. The embodiment shown in FIG. 11 also utilizes four supporting arms which may help balance the ring resonator structure and reduce cupping of the ring resonator during activation of the MEMs structure.

As in the embodiment of the present invention previously described with regard to FIGS. 8A and 8B, the present embodiment may be used to form a unit add-drop filter switch. The selective coupling may be used to achieve switched multiplexing and demultiplexing and to decrease signal loss inherent in the coupling of multiple waveguides. These unit switches can easily be extended to form large arrays. Within such a large array, each photonic switch may include structures using integrated circuit technology and surface MEMs technology. As a result, each unit device can also act as a switch, thus making the filter reconfigurable.

FIG. 11 shows a 3D perspective drawing of an exemplary structure of the present embodiment. Semiconductor substrate 500 is processed using conventional CMOS IC techniques to fabricate the MEMS control logic, array multiplex control, and other assorted electronics to be included. The surface of the silicon wafer may be planarized by a suitable technique such as chemical-mechanical polishing (CMP). In addition, the electronics are desirably sealed by substrate cap layer 702, using a suitable material, such as silicon carbide, which will be insensitive to the subsequent chemical etches that will be used in the MEMS processing. Openings for conductive standoffs 1106 are formed in the substrate cap layer to provide electrical connection to the MEMs structure and proper spacing between ring resonator 204 and waveguides 102 and 104.

The suspended structure is designed to be slightly tensile so that it is held stiffly away from the waveguides. This structure may be formed with supporting arms 1102 formed together with resonator cover 502, as shown in FIG. 11, or the supporting arms may be formed together with MEMs overlayer 1304, which is disposed over the resonator cover, as shown in FIGS. 13K–13M. A solid disc MEMs overlayer, as shown in FIGS. 13K–13M, may provide extra stability against cupping of the ring or disc resonator.

As described above, resonator cover 502 is desirably formed of a material with a significantly lower index of refraction than the resonator to increase confinement of optical fields within the resonator. This is additionally desirable in the present embodiment, as the connecting points of the supporting arms may cause scattering of the optical fields within the resonator. The resonator cover may also be fabricated to be wider than the resonator to further lower scattering. The addition of a MEMs overlayer may further isolate optical fields away from the connection points of the supporting arms, particularly if the MEMs overlayer is formed of a material having an even lower index of refraction. It is also noted that any of resonator 204, resonator cover 502, and MEMs overlayer 1304 may be formed as discs or as rings.

A relatively high resistance metal may be disposed over the resonator 204 to form heating element 504. Supporting arms 1102 are desirably thermally isolating. Heating element leads 1104 may be formed of a metal thin film, such as 0.02 microns of sputtered 20% titanium-tungsten to increase thermal isolation of the resonator structure. This allows a small amount of electrical power applied to heating element 504 to induce a significant temperature change, thereby tuning the index of refraction of the resonator material and to provide quick and simple adjustment of the resonant wavelength of the resonator.

Substrate electrodes 1100 and MEMs electrodes 1108 are placed for electrostatic attraction of the MEMs structure. The heating element leads may also be used to electrostatically attract to the substrate electrodes located below these leads. When an electrical signal is placed across the substrate electrodes and the MEMs electrodes, electrostatic attraction pulls the structure down, dramatically increasing the coupling between the waveguides and the resonator and activating the add/drop filter behavior of the wavelength selective optical waveguide coupler. When the force is removed, the tensile state of the released device causes it to snap back away from the waveguides. The discs may operate as an optical switch and a wavelength selective add/drop filter. Capacitance sensing circuitry may be included in CMOS control circuit substrate 500 to provide feedback control of the vertical placement of the MEMs structure. Other schemes, as described above, may be used to activate the device such as piezoelectric force and thermal action on a bi-material arm. The device may also be made mechanically latching.

Figure 12:
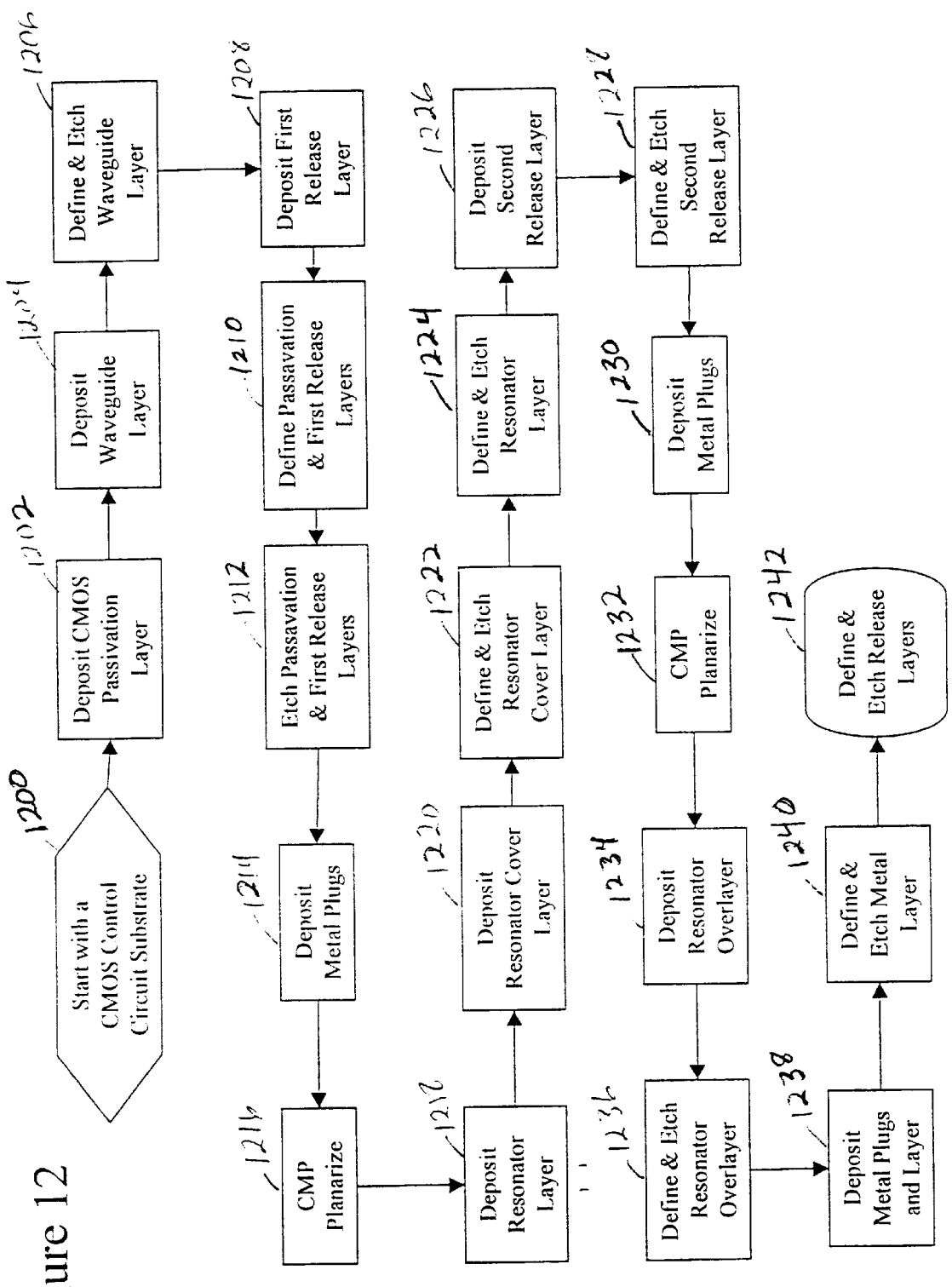
FIG. 12 is a flowchart describing an exemplary method of manufacturing the wavelength selective waveguide coupler shown in FIG. 11.

FIG. 12 is a flowchart describing an exemplary method of manufacturing the wavelength selective waveguide coupler shown in FIG. 11. This method of manufacture contains many of the same steps as the exemplary methods of manufacture described above with regard to FIGS. 3, 6, and 9. The various materials used and processes described previously for those steps may be employed in the present embodiment of the present invention as well. FIGS. 13A–13M illustrate various stages of the present exemplary process.

The fabrication of the exemplary structure shown in FIG. 12, starts with, for example, a CMOS control circuit substrate, step 1200, which contains previously formed control circuitry. CMOS control circuit substrate 500 is a semiconductor substrate that has been processed using conventional CMOS IC techniques and may include base circuit layer 700, planarized circuit layer 702, contacts 704 and substrate electrodes 1100. The control circuitry may include both MEMs control circuitry to cause the resonators to be dynamically coupled and decoupled and tuning circuitry to dynamically tune the resonant wavelengths of the resonators. The CMOS control circuit substrate may also include detectors and detector circuitry to monitor signals within the various waveguides and capacitance within the MEMs structure to ensure proper coupling of optical signals.

Figure 13A:
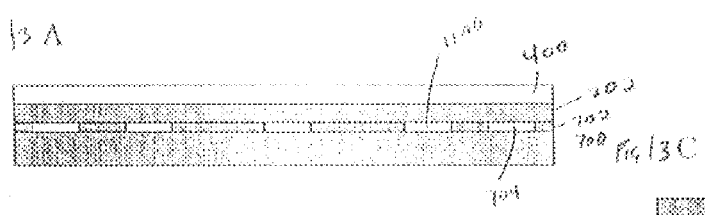

First, CMOS passivation layer 202 is deposited, step 1202, and waveguide layer 400 is deposited, step 1204. FIG. 13A illustrates an exemplary wavelength selective optical switch at this point in the manufacturing process.

Figure 13B:
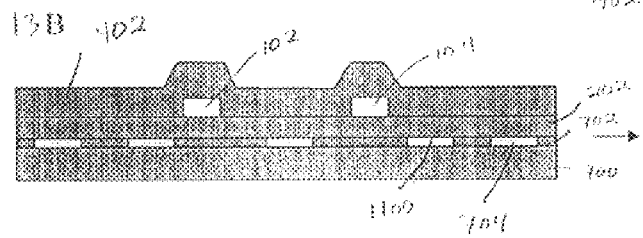
Figure 13C:
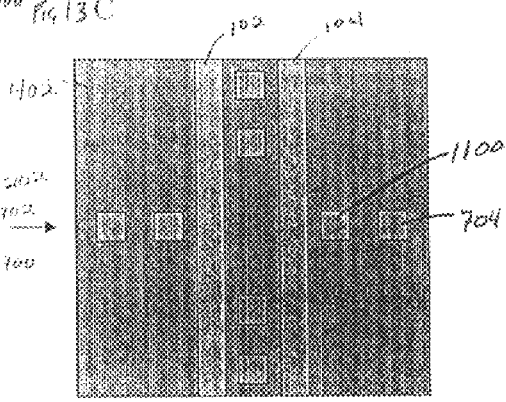

The two next steps are to define and etch waveguide layer 400 to form waveguides 102 and 104, step 1206, and to deposit first release layer 402, step 1208. FIGS. 13B and 13C illustrate an exemplary wavelength selective optical switch at these points in the manufacturing process.

Figure 13D:
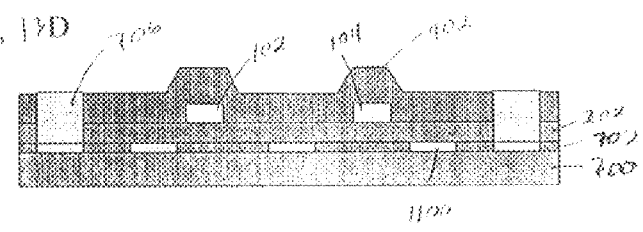

Next, the passivation and first release layers are defined, step 1210. Standard lithographic techniques may be used. The passivation and first release layers are then etched to expose contacts 704, step 1212. Contact plugs 706 are deposited on the contacts to extend through the passivation layer, step 1214. FIG. 13D illustrates an exemplary wavelength selective optical switch at this point in the manufacturing process.

First release layer 402 is then CMP planarized, step 1216. The CMP planarization method used desirably takes into account the exposed metal plugs. One function of this process step is to provide a sufficiently smooth surface on the spacing layer for deposition of resonator layer 404, step 1218. Next, the resonator cover layer is deposited, step 1220. FIG. 13E illustrates an exemplary wavelength selective optical switch following the deposition of the waveguide and bridge layer.

Next, the resonator cover layer is defined and etched, step 1222, forming resonator cover 502. This is followed by step 1224, defining and etching the resonator layer to form resonator 204, shown as a ring waveguide. This etch step may use a dry etch technique to provide smooth sidewalls. Alternatively, a wet etch technique may be used. FIGS. 13F and 13G illustrate an exemplary wavelength selective optical switch at this point in the manufacturing process.

The two next steps are to deposit second release layer 1300, step 1226, and to define and etch the second release layer to form vias extending to contact plugs 706, step 1228. Next, metal plugs are deposited in vias through the second release layer, step 1230, to form conductive standoffs 1106. FIG. 13H illustrates an exemplary wavelength selective optical switch at this point in the manufacturing process.

The MEMs structure is CMP planarized, step 1232, to expose resonator cover 502. FIGS. 13I and 13J illustrate an exemplary wavelength selective optical switch at this point in the manufacturing process. Note that combined release layer 1302 in FIGS. 13I–13K is a combination of first release layer 402 and second release layer 1300, which may be formed from the same material.

Next, a resonator overlayer is desirably deposited, step 1234. The resonator overlayer may be formed of any of a number of materials such as alumina or silicon carbide, which are substantially impervious to the processes used to remove the release layer. The next step, step 1236, is to define and etch the resonator overlayer to form supporting arms 1102 and MEMs overlayer 1304. Metal plugs, to complete the conductive standoffs, and a metal layer are deposited, step 1238. FIG. 13K illustrates an exemplary wavelength selective optical switch following the deposition of the metal plugs.

The metal layer is then defined and etched to form heating element 504, heating element leads 1104, and MEMs electrodes 1108, step 1240. The final step is to etch the combination release layer, step 1242. A dry etch release process may be used to avoid damage to the heating element and metal plugs. Complete removal of the first release layer from beneath the MEMs structure is desirable. FIG. 13L illustrates a side plan view of a completed exemplary wavelength selective optical switch and FIG. 13M illustrates a top plan view of a completed exemplary wavelength selective optical switch.

It is contemplated that the various embodiments of wavelength selective optical couplers described above may be integrated together to create large array multiplexer/demultiplexer chips which may add, drop, or split signals between a number of optical fibers simultaneously operating on multiple wavelength channels in both directions.

The resonators and MEMs structures of the present invention may operate as optical switches and as wavelength selective add/drop coupling filters. Therefore, it is possible to form a switching filter using them, combining two components, as well as the associated control circuitry, into one part. By integrating these two functions into one structure, the present invention may provide great simplification and miniaturization of the multiplexing/demultiplexing components in a multi-wavelength optical communications system. An array of these wavelength selective add/drop switches may be fabricated on a single semiconductor chip, which includes both the optical components and the control electronics in one compact device. Signal detection, signal generation, and/or signal amplification functions may be built into this device as well. The level of wavelength discrimination that may be attained by the resonators used in the present invention may also allow implementation of an increased density of wavelength channels, further increasing the capabilities of optical communications systems.

Figure 15A:
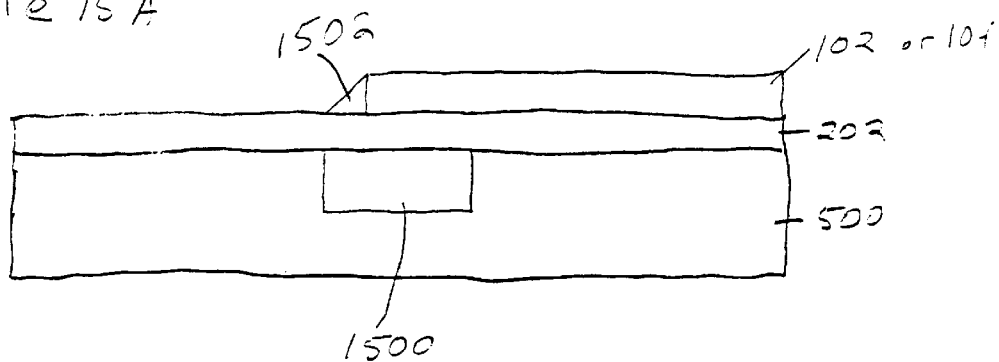
FIG. 15A is a cut-away side plan drawing illustrating an exemplary embodiment of an optical signal source formed in a portion of an multi-wavelength optical coupler of the present invention.
Figure 15B:
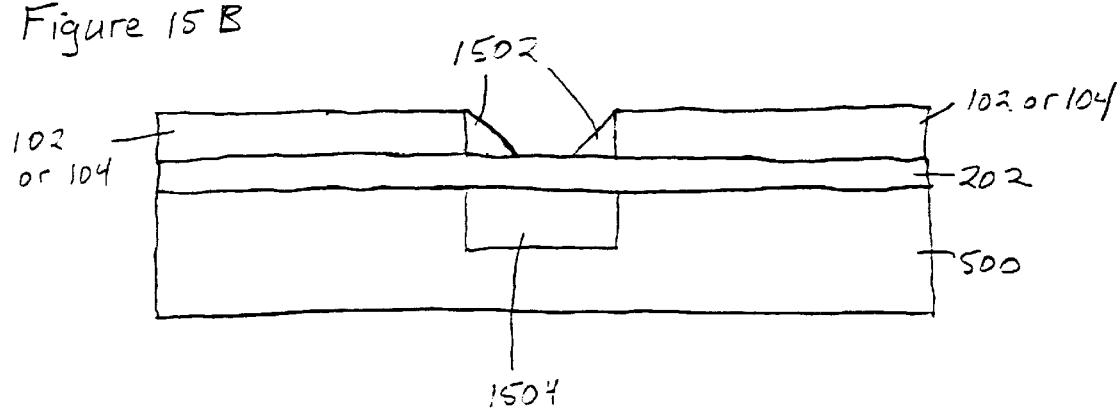
FIG. 15B is a cut-away side plan drawing illustrating an exemplary embodiment of an optical amplifier formed in a portion of an multi-wavelength optical coupler of the present invention.

FIGS. 15A and 15B are cut-away side plan drawings illustrating additional exemplary embodiments of a multi-wavelength optical component of the present invention. FIG. 15A shows an optical source 1500 formed within CMOS control circuit substrate 500. The light from this optical source is transmitted through the passivation layer 202 and coupled into either primary waveguide 102 or secondary waveguide 104 by optical source coupler 1502. Optical source coupler 1502 may be any coupling means typically used in optical fiber applications, such as a grating, prism, or mirror, and may desirably be formed of the same material as the waveguide during the waveguide etching step or may be formed separately.

The optical source may be a single-mode semiconductor laser, a multi-mode semiconductor laser, or may even be a broadband source, such as a light emitting diode (LED). Multi-mode laser and broad-band sources may be separated into a number of narrow-band channels by resonators within an exemplary optical component of the present invention to allow these channels to be driven simultaneously by the same source. Additionally, any of these optical sources may be operated as a substantially constant amplitude source or may be amplitude modulated to encode a signal.

In an exemplary embodiment of the present invention, a substantially constant amplitude source may have a signal encoded for a single signal channel by modulating the MEMs structure of a wavelength selective optical coupler to encode a digital signal by coupling and decoupling the waveguide containing the substantially constant amplitude signal to a second waveguide. It is contemplated that analog amplitude-modulated (AM) and frequency-modulated (FM) optical signals may be created by proper modulation of the MEMs structures and heating elements as well. These methods may provide the advantage of allowing a single optical source of the present invention to simultaneously drive several separate channels of optical communication operating at different wavelengths and each having its own information content. Additionally, continuous wave operation of the source may improve signal to noise characteristics of the resulting signal increasing potential bandwidth. Mode-locked operation of a laser source may also be possible and allow the use of lock-in amplifiers for detection to increase sensitivity.

FIG. 15B illustrates another exemplary embodiment of the present in which optical amplifier 1504 is formed as part of CMOS control circuit substrate 500. Optical couplers 1502 direct light from a waveguide through passivation layer 202 into the optical amplifier and then back out through the passivation layer into another waveguide. This feature may be useful when input signals are weak or when a signal is to be split between fibers.

Although the embodiments of the invention described above have been in terms of multi-wavelength optical communications systems, it is contemplated that similar concepts may be practiced with other types of optical systems. Also, it will be understood to one skilled in the art that a number of other modifications exist which do not deviate from the scope of the present invention as defined by the appended claims.

What is claimed is:

1. A wavelength selective optical coupling device comprising:

a substrate including a top surface and a bottom surface;

a primary waveguide formed on the top surface of the substrate in an ambient atmosphere, the primary waveguide including a first coupling portion and adapted to transmit a plurality of wavelengths of light;

a secondary waveguide formed on the top surface of the substrate in an ambient atmosphere and separate from the primary waveguide, the secondary waveguide including a second coupling portion and adapted to transmit the plurality of wavelengths of light;

a resonator including a dielectric member which extends parallel to the top surface of the substrate and overlaps, without contacting, the first coupling portion of the primary waveguide and the second coupling portion of the secondary waveguide, the dielectric member including an upper surface and a lower surface; and resonator coupling means for coupling the resonator to the top surface of the substrate;

wherein the resonator is sized to resonate at a subset of resonant wavelengths of the plurality of wavelengths of light.

2. A wavelength selective waveguide coupling device according to claim 1, wherein the substrate includes a CMOS control circuit layer and a passivation layer forming the top surface of the substrate.

3. A wavelength selective waveguide coupling device according to claim 2, wherein the CMOS control circuit layer includes at least one of:

silicon;

germanium;

InP;

GaAs;

InGaAs; and

InGaAsP.

4. A wavelength selective waveguide coupling device according to claim 2, wherein the passivation layer includes at least one of:

silicon dioxide;

silicon carbide; and alumina.

5. A wavelength selective waveguide coupling device according to claim 1, wherein:

the primary waveguide includes at least one of;
alumina;
hydrogenated amorphous silicon carbide;
silicon nitride; and
silicon oxynitride;

the secondary waveguide includes at least one of;
alumina;
hydrogenated amorphous silicon carbide;
silicon nitride; and
silicon oxynitride; and the dielectric member includes at least one of;
alumina;
hydrogenated amorphous silicon carbide;
silicon nitride; and
silicon oxynitride.

6. A wavelength selective waveguide according to claim 1, wherein the dielectric member comprises a disc-shaped element formed from an amorphous material.

7. A wavelength selective waveguide coupling device according to claim 1, wherein the resonator further includes a ring waveguide disposed on the lower surface of the dielectric member.

8. A wavelength selective waveguide coupling device according to claim 1, wherein the resonator further includes:

an electrical heating element disposed on the upper surface of the dielectric member; and means for applying an electric current to the electrical heating element;

whereby the subset of resonant wavelengths of the resonator is tuned by a level of the current applied to the heating element.

9. A wavelength selective waveguide coupling device according to claim 8, wherein the heating element includes at least one of:

titanium;

tungsten;

titanium-tungsten; and polysilicon.

10. A wavelength selective waveguide coupling device according to claim 8, wherein the substrate further includes wavelength control circuitry electrically coupled to the means for applying the electric current to the electrical heating element.

11. A wavelength selective waveguide coupling device according to claim 10, wherein the substrate further includes optical sensing means optically coupled to the secondary waveguide and electrically coupled to the wavelength control circuitry.

12. A wavelength selective waveguide coupling device according to claim 11, wherein optical sensing means includes an amorphous germanium optical detector.

13. A wavelength selective waveguide coupling device according to claim 8, wherein:

the means for applying the electric current to the electrical heating element includes a radio frequency (RF) signal generator providing an RF signal having a frequency selected to induce an electric current in the electrical heating element.

14. A wavelength selective waveguide coupling device according to claim 1, wherein the substrate further includes a laser optical signal source optically coupled to at least one of the primary waveguide and the secondary waveguide.

15. A wavelength selective waveguide coupling device according to claim 1, wherein the substrate further includes an optical amplifier optically coupled to at least one of the primary waveguide and the secondary waveguide.

16. A wavelength selective waveguide coupling device according to claim 1, wherein:

the substrate includes coupling control circuitry adapted to provide a waveguide coupling signal; and the resonator coupling means includes a bridge coupled to the top surface of the substrate and electrically coupled to the coupling control circuitry, the bridge adapted to deform and translate the resonator between a waveguide decoupled position and a waveguide coupled position responsive to the waveguide coupling signal;

whereby the resonator is optically coupled to the primary waveguide and the secondary waveguide in the waveguide coupled position and substantially decoupled from at least one of the primary waveguides and the secondary waveguide in the waveguide decoupled position.

17. A wavelength selective waveguide coupling device according to claim 16, wherein the bridge includes:

a first layer including a conductive portion and exhibiting a first coefficient of thermal expansion; and a second layer which exhibits a second coefficient of thermal expansion;

the first coefficient of thermal expansion and the second coefficient of thermal expansion selected such that the bridge deforms in response to heat generated when the waveguide coupling signal is applied to the conductive portion of the first layer due to unequal expansion of the first layer as compared to the second layer.

18. A wavelength selective waveguide coupling device according to claim 16, wherein:

the substrate includes a substrate electrode electrically coupled to the coupling control circuitry; and the bridge includes a bridge electrode electrically coupled to the coupling control circuitry;

whereby the waveguide coupling signal deforms the bridge based on an electrostatic attraction between the bridge electrode and the substrate electrode.

19. A wavelength selective waveguide coupling device according to claim 16, wherein the bridge includes:

a flexible portion;

a piezoelectric portion including a first end and a second end;

a first electrode coupled to the first end of the piezoelectric portion and electrically coupled to the coupling control circuitry of the substrate; and a second electrode coupled to the second end of the piezoelectric portion and electrically coupled to the coupling control circuitry of the substrate;

the piezoelectric portion deforming in response to the waveguide coupling signal and being sized and arranged such that the flexible portion of the bridge deforms in response to the deformation of the piezoelectric portion.

20. A wavelength selective waveguide coupling device according to claim 16, wherein the bridge includes:
   a strained portion;
   an electrostrictive portion including a first end and a second end, connected to the strained portion in elastic opposition;
   a first electrode coupled to the first end of the electrostrictive portion and electrically coupled to the coupling control circuitry of the substrate; and
   a second electrode coupled to the second end of the electrostrictive portion and electrically coupled to the coupling control circuitry of the substrate;
   the electrostrictive portion deforming in response to the waveguide coupling signal and being sized and arranged such that strained portion of the bridge deforms in response to the deformation of the electrostrictive portion.

21. A wavelength selective waveguide coupling device according to claim 1, wherein:
   the substrate includes coupling control circuitry adapted to provide a waveguide coupling signal;
   the resonator coupling means includes;
      a bridge coupled to the resonator and electrically coupled to the coupling control circuitry, the bridge adapted to deform and translate the resonator between a waveguide decoupled position and a waveguide coupled position based on the waveguide coupling signal; and
      a spacing column including a first end coupled to the bridge and a second end coupled to the resonator;
   whereby the resonator is optically coupled to the primary waveguide and the secondary waveguide in the waveguide coupled position.

22. A wavelength selective waveguide according to claim 21 further comprising:
   an electrical heating element disposed on the upper surface of the dielectric member; and
   means for applying an electric current to the electrical heating element whereby the subset of resonant wavelengths of the resonator is tuned responsive to a level of the current applied to the heating element.

23. A wavelength selective waveguide according to claim 22 wherein the means for applying the electric current to the electrical heating element includes a radio frequency (RF) signal generator providing an RF signal having a frequency selected to induce an electric current in the electrical heating element.

24. A wavelength selective waveguide according to claim 22 wherein the means for applying the electric current to the electrical heating element includes at least first and second conductors connecting the electrical heating element to the control circuitry via the bridge and the spacing column.

25. A wavelength selective waveguide coupling device according to claim 1, wherein the dielectric member includes at least one of a dielectric disc and a ring waveguide.

26. A wavelength selective waveguide coupling device according to claim 1, wherein the resonator coupling means are sized and arranged such that the resonator coupling means does not interfere with the primary waveguide, the secondary waveguide, or the resonator.

27. A wavelength selective waveguide coupling device according to claim 1, wherein:
   the substrate includes coupling control circuitry adapted to provide a waveguide coupling signal;
   the resonator coupling means includes;
      a bridge coupled to the resonator and electrically coupled to the coupling control circuitry, the bridge adapted to deform and translate the resonator between a waveguide decoupled position and a waveguide coupled position based on the waveguide coupling signal; and
      a spacing column including a first end coupled to the bridge and a second end coupled to the substrate;
      whereby the resonator is optically coupled to the primary waveguide and the secondary waveguide in the waveguide coupled position.

28. A wavelength selective waveguide coupling device according to claim 1, wherein:
   the substrate includes coupling control circuitry adapted to provide a waveguide coupling signal;
   the resonator coupling means includes a bridge coupled to the top surface of the substrate and electrically coupled to the coupling control circuitry, the bridge adapted to deform and translate the resonator to a plurality of positions responsive to the waveguide coupling signal, the plurality of positions including at least one signal splitting position;
   whereby the resonator is partially optically coupled to the primary waveguide and the secondary waveguide in the at least one signal splitting position.

29. A multi-wavelength optical multiplexer comprising:
   a substrate including a top surface and a bottom surface, and coupling control circuitry adapted to provide a plurality of waveguide coupling signals;
   a plurality of waveguides disposed on the top surface of the substrate, each waveguide separated from the remaining waveguides, and adapted to transmit the plurality of wavelengths of light; and
   a plurality of switchable wavelength selective optical couplers coupled to the top surface of the substrate and adapted to resonate at a subset of resonant wavelengths of the plurality of wavelengths of light, each switchable wavelength selective optical coupler including;
      a resonator including a dielectric member which extends parallel to the top surface of the substrate and overlaps, without contacting, at least two of the plurality of waveguides, the dielectric member including an upper surface and a lower surface; and
      a bridge coupled to the resonator and electrically coupled to the coupling control circuitry, the bridge adapted to deform and translate the resonator between a waveguide decoupled position and a waveguide coupled position responsive to one of the plurality of waveguide coupling signals;
      whereby the resonator is optically coupled to the at least two of the plurality of waveguides in the waveguide coupled position.

30. A multi-wavelength optical multiplexer according to claim 29, wherein the plurality of waveguides includes a main waveguide and a plurality of branch waveguides, wherein a portion of each of the branch waveguides is positioned proximate to the main waveguide and to a respective one of the plurality of switchable wavelength selective optical couplers, whereby when one of the resonators is optically coupled to the main waveguide and a respective one of the branch waveguides, optical signals are transferred between the main waveguide and the one branch waveguide.

31. A multi-wavelength optical multiplexer according to claim 30, wherein a group of the plurality of resonators are tuned to respectively different subsets of the resonant wavelengths, whereby, when one resonator of the group of resonators is optically coupled to the main waveguide and to a respective one of the plurality of branch waveguides, optical signals having the subset of resonant wavelengths to which the one
resonator is tuned is transferred between the main waveguide and the one of the branch waveguides to the relative exclusion of optical signals having wavelengths outside of the subset of resonant wavelengths to which the one resonator is tuned.

32. A method of manufacturing a wavelength selective waveguide coupling device which includes a substrate; a primary waveguide transmitting a plurality of optical signals having a plurality of wavelengths; a secondary waveguide; a resonator which extends over the primary waveguide and the secondary waveguide; and a pedestal to couple the resonator to the substrate, the method comprising the steps of:
  a) planarizing the substrate;
  b) depositing a passivation layer on the substrate, the passivation layer including an electrically insulating and optically transmissive material characterized by a first index of refraction;
  c) depositing a waveguide layer on the passivation layer, the waveguide layer including an optically transmissive material characterized by a second index of refraction and a waveguide thickness, the second index of refraction being greater than the first index of refraction;
  d) defining and etching the waveguide layer to form the primary waveguide and the secondary waveguide;
  e) depositing a release layer over the passivation layer, the primary waveguide, and the secondary waveguide, the release layer having a first thickness on top of the passivation layer, the first thickness being greater than the waveguide thickness;
  f) planarizing the release layer, the planarized release layer having a second thickness on top of the passivation layer, the second thickness being greater than the waveguide thickness;
  g) depositing a resonator layer on the release layer, the resonator layer including an optically transmissive material with a third index of refraction, the third index of refraction being substantially the same as the second index of refraction;
  h) defining and etching the resonator layer to form the resonator; and
  i) etching the release layer to form the pedestal and to uncover the primary waveguide and the secondary waveguide.

33. A method of manufacturing a wavelength selective waveguide coupling device according to claim 32, wherein:
  step a) includes the step of chemical-mechanical planarizing the substrate;
  step f) includes the step of chemical-mechanical planarizing the release layer.

34. A method of manufacturing a wavelength selective waveguide coupling device which includes a CMOS control circuit substrate having a top surface; a primary waveguide; a secondary waveguide; a resonator which extends over the primary waveguide and the secondary waveguide; a heating means to tune a resonant wavelength of the resonator; and a coupling means to couple the resonator to the substrate, the method comprising the steps of:
  a) planarizing the top surface of the CMOS control circuit substrate;
  b) depositing a passivation layer on the top surface of the CMOS control circuit substrate, the passivation layer including an electrically insulating and optically transmissive material characterized by a first index of refraction;
  c) depositing a waveguide layer on the passivation layer, the waveguide layer including an optically transmissive material characterized by a second index of refraction and a waveguide thickness, the second index of refraction being greater than the first index of refraction;
  d) defining and etching the waveguide layer to form the primary waveguide and the secondary waveguide;
  e) defining and etching the passivation layer to form a first plurality of vias exposing a plurality of electrical contacts on the top surface of the CMOS control circuit substrate;
  f) depositing a first plurality of metal plugs in the first plurality of vias, the first plurality of metal plugs electrically coupled to the electrical contacts;
  g) depositing a release layer over the passivation layer, the first plurality of metal plugs, the primary waveguide, and the secondary waveguide, the release layer having a first thickness on top of the passivation layer, the first thickness being greater than the waveguide thickness;
  h) defining and etching the release layer to form a second plurality of vias exposing the first plurality of metal plugs;
  i) depositing a second plurality of metal plugs in the second plurality of vias, the second plurality of metal plugs electrically coupled to the first plurality of metal plugs and forming at least a portion of the coupling means;
  j) planarizing the release layer and the second plurality of metal plugs, the planarized release layer having a second thickness on top of the passivation layer, the second thickness being greater than the waveguide thickness;
  k) depositing a resonator layer on the release layer and the second plurality of metal plugs, the resonator layer including an optically transmissive material characterized by a third index of refraction, the third index of refraction being substantially the same as the second index of refraction;
  l) depositing a resonator cover layer on the resonator layer, the resonator cover layer including an electrically insulating and optically transmissive material characterized by a fourth index of refraction, the fourth index of refraction being less than the third index of refraction;
  m) defining and etching the resonator cover layer to form a resonator cover and a third plurality of vias;
  n) defining and etching the resonator layer to form the resonator and a fourth plurality of vias extending from the third plurality of vias to the second plurality of metal plugs;
  o) depositing a third plurality of metal plugs in the fourth plurality of vias and the third plurality of vias, the third plurality of metal plugs being electrically coupled to the second plurality of metal plugs;
  p) depositing a heating layer on the resonator cover, the heating layer including an electrically conductive material and being electrically coupled to the third plurality of metal plugs;

q) defining and etching the heating layer to form the heating means; and r) etching the release layer to uncover the primary waveguide and the secondary waveguide and substantially remove the release layer.

35. A method of manufacturing a wavelength selective waveguide coupling device according to claim 34, wherein step r) includes the step of dry etching the release layer to uncover the primary waveguide and the secondary waveguide and substantially remove the release layer.

36. A method of manufacturing a wavelength selective waveguide coupling device which includes a CMOS control circuit substrate having a top surface; a primary waveguide; a secondary waveguide; a resonator which extends over the primary waveguide and the secondary waveguide; a heating means to tune a resonant wavelength of the resonator; a coupling means to couple the resonator to the substrate; and at least one deformable bridge adapted to translate the resonator between a coupled position and a decoupled position, the method comprising the steps of:

a) depositing a CMOS cap layer on the top surface of the CMOS control circuit substrate, the CMOS cap layer including an electrically insulating material;

b) depositing a passivation layer on the top surface of the CMOS cap layer, the passivation layer including an optically transmissive material exhibiting a first index of refraction;

c) defining and etching the passivation layer to form a first plurality of vias and openings to allow release of the at least one deformable bridge;

d) defining and etching the CMOS cap layer to form a second plurality of vias extending from the first plurality of vias to a plurality of electrical contacts on the top surface of the CMOS control circuit substrate;

e) depositing a first plurality of metal plugs in the second plurality of vias and the first plurality of vias, the first plurality of metal plugs electrically coupled to the electrical contacts;

f) depositing a first release layer to fill in the openings in the passivation layer;

g) planarizing the passivation layer, the release layer, and the first plurality of metal plugs;

h) depositing a waveguide and bridge layer on the passivation layer, the release layer, and the first plurality of metal plugs, the waveguide and bridge layer including an optically transmissive material characterized by a second index of refraction and a waveguide thickness, the second index of refraction being greater than the first index of refraction;

i) defining and etching the waveguide layer to form the primary waveguide, the secondary waveguide, and the at least one deformable bridge, the at least one deformable bridge including a third plurality of vias exposing the first plurality of metal plugs;

j) depositing a second plurality of metal plugs in the third plurality of vias, the second plurality of metal plugs electrically coupled to the first plurality of metal plugs;

k) depositing a plurality of bridge electrodes on the at least one deformable bridge, the plurality of bridge electrodes including an electrically conductive material and being electrically coupled to the second plurality of metal plugs;

l) depositing a second release layer over the passivation layer, the first release layer, the primary waveguide, the secondary waveguide, the at least one deformable bridge and the plurality of bridge electrodes, the second release layer having a first thickness on top of the passivation layer, the first thickness being greater than the waveguide thickness;

m) defining and etching the release layer to form a forth plurality of vias exposing a contact portion of the plurality of bridge electrodes;

n) depositing a third plurality of metal plugs in the forth plurality of vias, the third plurality of metal plugs electrically coupled to the plurality of bridge electrodes and forming at least a portion of the coupling means;

o) planarizing the second release layer and the third plurality of metal plugs, the planarized second release layer having a second thickness on top of the passivation layer, the second thickness being greater than the waveguide thickness;

p) depositing a resonator layer on the second release layer and the third plurality of metal plugs, the resonator layer including an optically transmissive material characterized by a third index of refraction, the third index of refraction being substantially the same as the second index of refraction;

q) depositing a resonator cover layer on the resonator layer, the resonator cover layer including an electrically insulating and optically transmissive material characterized by a fourth index of refraction, the fourth index of refraction being less than the third index of refraction;

r) defining and etching the resonator cover layer to form a resonator cover and a fifth plurality of vias;

s) defining and etching the resonator layer to form the resonator and a sixth plurality of vias extending from the fifth plurality of vias to the third plurality of metal plugs;

t) depositing a fourth plurality of metal plugs in the sixth plurality of vias and the fourth plurality of vias, the fourth plurality of metal plugs electrically coupled to the third plurality of metal plugs;

u) depositing a heating layer on the resonator cover, the heating layer including an electrically conductive material and being electrically coupled to the fourth plurality of metal plugs;

v) defining and etching the heating layer to form the heating means; and w) etching the second release layer and the first release layer to uncover the primary waveguide and the secondary waveguide, release the at least one deformable bridge, and substantially remove the release layer.

37. A method encoding information as a narrow wavelength band digital optical signal using an integrated optical component including an optical source optically coupled to a first waveguide; a second waveguide; a resonator sized to resonate in a narrow resonator wavelength band; a resonator translating means adapted to translate the resonator between a coupled position in which the resonator optically couples the first waveguide to the second waveguide and a decoupled position in which the resonator does not optically couples the first waveguide to the second waveguide; and control circuitry electrically coupled to the resonator coupling means and adapted to form a digital electric signal in response to the information, the method comprising the steps of:

a) operating the optical source to provide optical radiation to the first waveguide, the optical radiation exhibiting a substantially constant amplitude and a source wavelength band which includes the narrow resonator wavelength band;

b) providing the information to the control circuitry to form the digital electric signal;

c) providing the digital electric signal to the resonator translating means to translate the resonator between the coupled position and the decoupled position; and d) transferring optical radiation in the narrow resonator wavelength band from the first waveguide to the second waveguide when the resonator is in the coupled position and not transferring optical radiation from the first waveguide to the second waveguide when the resonator is in the decoupled position to form the narrow wavelength band digital optical signal in the second waveguide.

* * * * *